(12) United States Patent
Yapici et al.

(10) Patent No.: US 12,047,144 B2
(45) Date of Patent: Jul. 23, 2024

(54) TECHNIQUES FOR CHANNEL STATE INFORMATION BASED ARTIFICIAL NOISE INJECTION

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 17/556,782

(22) Filed: Dec. 20, 2021

(65) Prior Publication Data

US 2023/0198592 A1   Jun. 22, 2023

(51) Int. Cl.
| H04B 7/00 | (2006.01) |
| H04B 7/06 | (2006.01) |
| H04B 17/391 | (2015.01) |
| H04W 72/20 | (2023.01) |

(52) U.S. Cl.
CPC ....... H04B 7/0626 (2013.01); H04B 17/3912 (2015.01); H04W 72/20 (2023.01)

(58) Field of Classification Search
None
See application file for complete search history.

(56) References Cited

U.S. PATENT DOCUMENTS

| 11,075,710 | B2 | 7/2021 | Arslan et al. | |
| 11,843,556 | B2 * | 12/2023 | Park | H04B 1/713 |
| 2018/0337757 | A1 * | 11/2018 | Noh | H04L 27/26 |
| 2020/0045707 | A1 * | 2/2020 | Hwang | H04W 72/23 |
| 2020/0083994 | A1 * | 3/2020 | Marinier | H04L 5/001 |

FOREIGN PATENT DOCUMENTS

CN   105612726 A   *   5/2016   ........... H04B 7/0626

* cited by examiner

*Primary Examiner* — Gerald A Smarth
(74) *Attorney, Agent, or Firm* — Holland & Hart LLP

(57) ABSTRACT

Methods, systems, and devices for wireless communications are described. A wireless communications system may support techniques for channel state information (CSI) based artificial noise injection. In some cases, a base station may receive an indication of CSI associated with a channel for communications with the UE. The base station may apply artificial noise signals, based on the CSI, to a set of first signals associated with control channel transmissions to obtain a set of second signals. The UE may receive the set of second signals and apply pseudo-noise signals, based on the CSI, to the set of second signals to remove or reduce the artificial noise. The UE may combine the set of second signals adjusted by applying the pseudo-noise signals to obtain a combined signal. The UE may decode the combined signal to obtain control information.

30 Claims, 17 Drawing Sheets

TECHNIQUES FOR CHANNEL STATE INFORMATION BASED ARTIFICIAL NOISE INJECTION

FIELD OF TECHNOLOGY

The following relates to wireless communications, including techniques for channel state information based artificial noise injection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, wireless devices may communicate data, control information, or both. For example, a base station may transmit a control channel transmission, such as physical downlink control channel (PDCCH) transmission, to a UE. However, in some cases, an unauthorized device may attempt to receive and decode the communications. Additionally or alternatively, the unauthorized device may attempt to corrupt or modify the communications, among other malicious activities, which may result in a lack of confidentiality and integrity of the communications, relatively inefficient communications, and the like.

SUMMARY

The described techniques relate to improved methods, systems, devices, and apparatuses that support techniques for channel state information (CSI) based artificial noise injection. Generally, the described techniques enable a transmitting device to add artificial noise to communications to a receiving device such that the receiving device may reduce or eliminate the artificial noise (e.g., using information such as CSI) while an unauthorized device may be unable to successfully decode the communications due to the artificial noise. For example, a first wireless device (e.g., a base station) may apply an artificial noise signal to each signal in a set of first signals associated with a control channel transmission, which may result in a set of second signals. The artificial noise signals may be based on the CSI of the respective resources for transmitting the set of first signals. As such, a different artificial noise signal may be applied to each signal in the set of first signals associated with the control channel transmissions, where the artificial noise signal is based on channel properties of the communication links between the first wireless device and an authorized second wireless device (e.g., a user equipment (UE)).

The first wireless device may transmit each signal in the set of second signals to the second wireless device. For example, the first wireless device may transmit multiple control channel transmissions associated with (e.g., including) the set of second signals. The multiple control channel transmissions may be sent over resources that repeat in the time domain, the frequency domain, or both. The second wireless device may receive the set of second signals and apply a respective pseudo-noise signal to each signal in the set of second signals to obtain a set of third signals without the artificial noise. The respective pseudo-noise signal may be based on the CSI of the respective resources carrying a control channel transmission. The second wireless device may combine the set of thirds signals to obtain a combined signal for the control channel transmissions, which may enable the second wireless device to successfully decode the combined control channel transmission to obtain control information and/or data.

A method for wireless communications at a user equipment (UE) is described. The method may include receiving a set of first signals associated with a set of multiple control channel transmissions of a control channel candidate, applying respective pseudo-noise signals to the set of multiple control channel transmissions to obtain a set of second signals, where the respective pseudo-noise signals are based on CSI of respective resources associated with the set of multiple control channel transmissions, combining the set of second signals for the set of multiple control channel transmissions to obtain a combined signal, and decoding the combined signal to obtain control information of the control channel candidate.

An apparatus for wireless communications at a UE is described. The apparatus may include a processor, memory coupled with the processor, and instructions stored in the memory. The instructions may be executable by the processor to cause the apparatus to receive a set of first signals associated with a set of multiple control channel transmissions of a control channel candidate, apply respective pseudo-noise signals to the set of multiple control channel transmissions to obtain a set of second signals, where the respective pseudo-noise signals are based on CSI of respective resources associated with the set of multiple control channel transmissions, combine the set of second signals for the set of multiple control channel transmissions to obtain a combined signal, and decode the combined signal to obtain control information of the control channel candidate.

Another apparatus for wireless communications at a UE is described. The apparatus may include means for receiving a set of first signals associated with a set of multiple control channel transmissions of a control channel candidate, means for applying respective pseudo-noise signals to the set of multiple control channel transmissions to obtain a set of second signals, where the respective pseudo-noise signals are based on CSI of respective resources associated with the set of multiple control channel transmissions, means for combining the set of second signals for the set of multiple control channel transmissions to obtain a combined signal, and means for decoding the combined signal to obtain control information of the control channel candidate.

A non-transitory computer-readable medium storing code for wireless communications at a UE is described. The code may include instructions executable by a processor to receive a set of first signals associated with a set of multiple control channel transmissions of a control channel candidate, apply respective pseudo-noise signals to the set of multiple control channel transmissions to obtain a set of second signals, where the respective pseudo-noise signals are based on CSI of respective resources associated with the set of multiple control channel transmissions, combine the set of second signals for the set of multiple control channel transmissions to obtain a combined signal, and decode the combined signal to obtain control information of the control channel candidate.

In some examples of the method, apparatuses, and non-transitory computer-readable medium described herein, combining the set of second signals may include operations, features, means, or instructions for summing the set of second signals for the set of multiple control channel transmissions according to respective weight factors for the set of multiple control channel transmissions.

Some examples of the method, apparatuses, and non-transitory computer-readable medium described herein may further include operations, features, means, or instructions for receiving the set of multiple control channel transmissions via downlink control channel resource blocks that may be repeated in a frequency domain, a time domain, or both, based on a downlink control information format, one or more latency thresholds, or a combination thereof.

In some examples of the method, apparatuses, and non-transitory computer-readable medium described herein, at least a first subset of the downlink control channel resource blocks may be separated from at least a second subset of the downlink control channel resource blocks by a threshold value in the time domain, the frequency domain, or a combination thereof.

Some examples of the method, apparatuses, and non-transitory computer-readable medium described herein may further include operations, features, means, or instructions for receiving the set of multiple control channel transmissions via downlink control channel resource blocks, where that may be repeated in a single slot of a time domain, where each downlink control channel resource block may be transmitted using a different beam.

Some examples of the method, apparatuses, and non-transitory computer-readable medium described herein may further include operations, features, means, or instructions for receiving the set of multiple control channel transmissions via downlink control channel resource blocks that may be repeated in a frequency domain, and where the set of multiple control channel transmissions may be associated with an aggregation level of a set of aggregation levels that may be based on a quantity of repetitions of the set of multiple control channel transmissions.

In some examples of the method, apparatuses, and non-transitory computer-readable medium described herein, the aggregation level includes a first aggregation level for a first quantity of repetitions or a second aggregation level for a second quantity of repetitions.

In some examples of the method, apparatuses, and non-transitory computer-readable medium described herein, a power allocated to each control channel transmission may be based on a channel quality indicator, a quality of service threshold, a security threshold, or any combination thereof.

Some examples of the method, apparatuses, and non-transitory computer-readable medium described herein may further include operations, features, means, or instructions for receiving control signaling indicating resources for the set of multiple control channel transmissions in one or more search space sets.

In some examples of the method, apparatuses, and non-transitory computer-readable medium described herein, the control signaling includes radio resource control signaling.

In some examples of the method, apparatuses, and non-transitory computer-readable medium described herein, each symbol of a respective noise signal included in a respective control channel transmission may have a value associated with a constellation point from a finite constellation or a random constellation point.

A method for wireless communications at a base station is described. The method may include receiving control signaling indicating channel state information associated with a channel for communications with a UE, applying, to each signal of a set of first signals associated with a set of multiple control channel transmissions of a control channel candidate, a respective pseudo-noise signal to obtain a set of second signals, where the respective pseudo-noise signals are based on the CSI of respective resources associated with the set of multiple control channel transmissions, and transmitting, to the UE, the set of second signals for the set of multiple control channel transmissions.

An apparatus for wireless communications at a base station is described. The apparatus may include a processor, memory coupled with the processor, and instructions stored in the memory. The instructions may be executable by the processor to cause the apparatus to receive control signaling indicating channel state information associated with a channel for communications with a UE, apply, to each signal of a set of first signals associated with a set of multiple control channel transmissions of a control channel candidate, a respective pseudo-noise signal to obtain a set of second signals, where the respective pseudo-noise signals are based on the CSI of respective resources associated with the set of multiple control channel transmissions, and transmit, to the UE, the set of second signals for the set of multiple control channel transmissions.

Another apparatus for wireless communications at a base station is described. The apparatus may include means for receiving control signaling indicating channel state information associated with a channel for communications with a UE, means for applying, to each signal of a set of first signals associated with a set of multiple control channel transmissions of a control channel candidate, a respective pseudo-noise signal to obtain a set of second signals, where the respective pseudo-noise signals are based on the CSI of respective resources associated with the set of multiple control channel transmissions, and means for transmitting, to the UE, the set of second signals for the set of multiple control channel transmissions.

A non-transitory computer-readable medium storing code for wireless communications at a base station is described. The code may include instructions executable by a processor to receive control signaling indicating channel state information associated with a channel for communications with a UE, apply, to each signal of a set of first signals associated with a set of multiple control channel transmissions of a control channel candidate, a respective pseudo-noise signal to obtain a set of second signals, where the respective pseudo-noise signals are based on the CSI of respective resources associated with the set of multiple control channel transmissions, and transmit, to the UE, the set of second signals for the set of multiple control channel transmissions.

Some examples of the method, apparatuses, and non-transitory computer-readable medium described herein may further include operations, features, means, or instructions for transmitting the set of multiple control channel transmissions via downlink control channel resource blocks that may be repeated in a frequency domain, a time domain, or both, based on a downlink control information format, one or more latency thresholds, or a combination thereof.

In some examples of the method, apparatuses, and non-transitory computer-readable medium described herein, at least a first subset of the downlink control channel resource blocks may be separated from at least a second subset of the downlink control channel resource blocks by a threshold value in the time domain, the frequency domain, or a combination thereof.

Some examples of the method, apparatuses, and non-transitory computer-readable medium described herein may further include operations, features, means, or instructions for transmitting the set of multiple control channel transmissions via downlink control channel resource blocks that may be repeated in a single slot of a time domain, where each downlink control channel resource block may be transmitted using a different beam.

Some examples of the method, apparatuses, and non-transitory computer-readable medium described herein may further include operations, features, means, or instructions for transmitting the set of multiple control channel transmissions via downlink control channel resource blocks that may be repeated in a frequency domain, where the set of multiple control channel transmissions may be associated with an aggregation level of a set of aggregation levels that may be based on a quantity of repetitions of the set of multiple control channel transmissions.

In some examples of the method, apparatuses, and non-transitory computer-readable medium described herein, the aggregation level includes a first aggregation level for a first quantity of repetitions or a second aggregation level for a second quantity of repetitions.

Some examples of the method, apparatuses, and non-transitory computer-readable medium described herein may further include operations, features, means, or instructions for allocating a power to each control channel transmission based on a channel quality indicator, a quality of service threshold, a security threshold, or any combination thereof.

Some examples of the method, apparatuses, and non-transitory computer-readable medium described herein may further include operations, features, means, or instructions for transmitting control signaling indicating resources for the set of multiple control channel transmissions in one or more search space sets.

In some examples of the method, apparatuses, and non-transitory computer-readable medium described herein, the control signaling includes radio resource control signaling.

Some examples of the method, apparatuses, and non-transitory computer-readable medium described herein may further include operations, features, means, or instructions for selecting a value for each respective pseudo-noise signal, the value associated with a constellation point from a finite constellation or a random constellation point.

DETAILED DESCRIPTION

Figure 1:
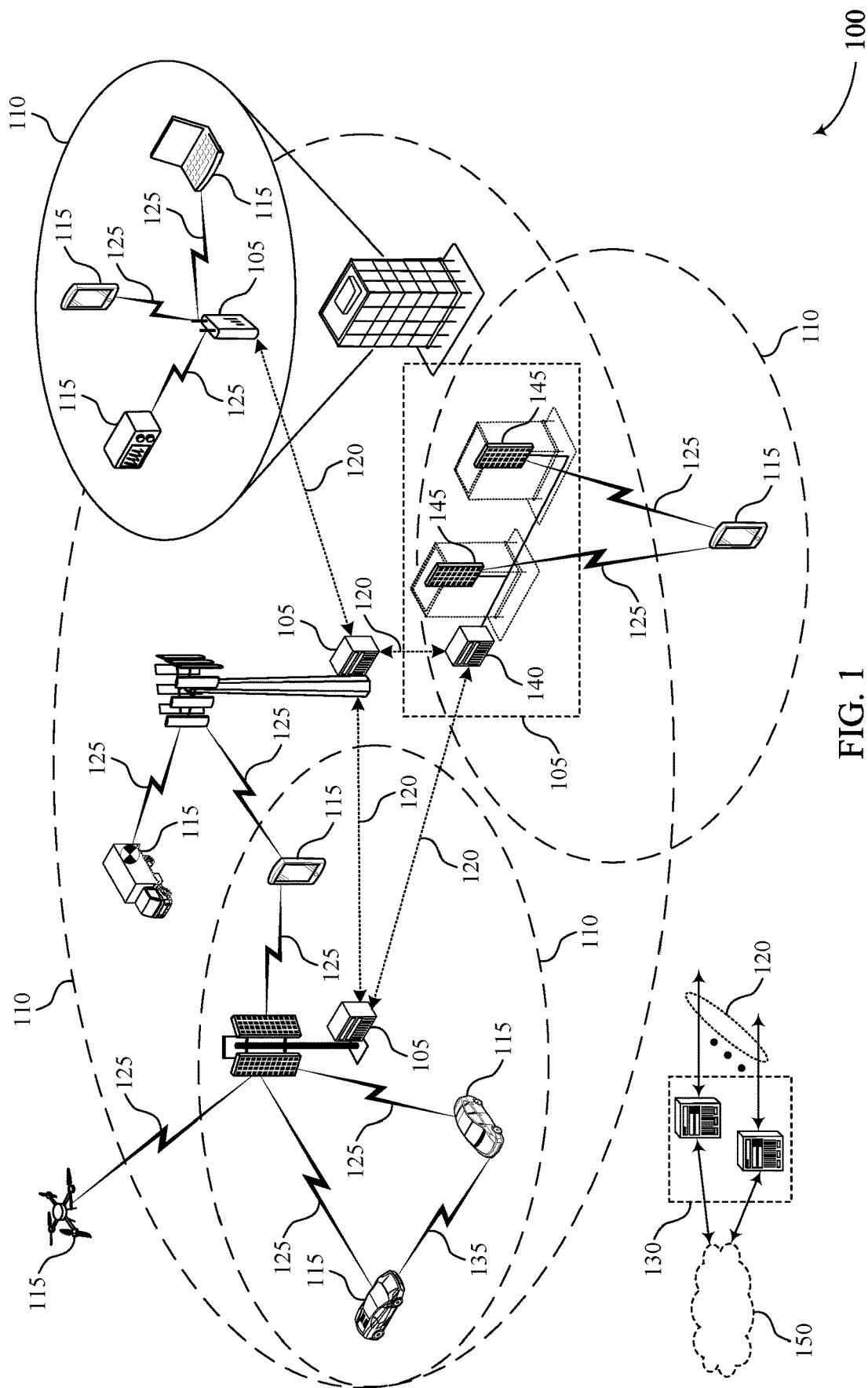
FIG. 1 illustrates an example of a wireless communications system that supports techniques for channel state information (CSI) based artificial noise injection in accordance with aspects of the present disclosure.

Some wireless communications systems may support communications of control information or data via various layers of signaling, such as lower layer signaling (e.g., L1 signaling, L2 signaling, and low level transmissions, such as downlink control information (DCI) based physical downlink control channel (PDCCH) transmissions, among other examples of lower layer signaling). For example, a base station may transmit a control channel transmission, such as a PDCCH transmission, to an authorized user equipment (UE) (e.g., a UE that is the intended recipient of the control channel transmission). In some cases, an unauthorized device (e.g., a UE that is not the intended recipient of the control channel transmission), may attempt to receive and decode the control channel transmission to obtain the control information. That is, the unauthorized device may attempt to intercept (e.g., capture or steal) the control channel transmission and decode the control channel transmission to obtain confidential message contents (e.g., the control information). Additionally or alternatively, the unauthorized device may attempt to perform an attack (e.g., an adversary attack) on the control channel transmission, such as corrupting or modifying the control channel transmission or injecting a virus into the control channel transmission, among other malicious activities. The unauthorized device may be successful in receiving, decoding, or performing an attack due to a lack of security protection on the control channel transmission. Lack of security protections on the control channel transmissions may expose the wireless communications system to successful malicious activities resulting in a lack of confidentiality and integrity of the control channel transmissions, and reliability of the subsequent communication steps. Additionally or alternatively, the successful malicious activity may result in failed or delayed reception or decoding of the control channel transmissions. Techniques for providing security for such lower layer signaling may be desired.

Accordingly, techniques described herein may support security protections for communications via lower layer signaling, such as control channel transmissions (e.g., DCI based PDCCH). Generally, the described techniques may enable a base station to apply artificial noise signals to a set of signals associated with control channel transmissions, which may inhibit an unauthorized or adversary device from receiving, decoding, or performing an attack, among other malicious actions, on the control channel transmission. In some examples, the base station may apply respective artificial noise signals (e.g., in the power domain) to a set of first signals associated with multiple control channel transmissions to obtain a set of second signals to transmit to an authorized UE. Thus, the set of second signals may include artificial noise and may be associated with the control channel transmissions (e.g., the control channel transmissions may include control information or other data carried by the set of second signals). In some cases, the artificial noise may be generated according to an artificial or pseudo-noise (e.g., pseudo-random noise) generation function.

The artificial noise signals may be based on channel state information (CSI) of respective resources associated with the control channel transmissions. That is, the artificial noise signal may be based channel properties of the communication links between the base station and the authorized UE. For example, the artificial noise may be generated and applied to a signal using the CSI associated with the signal, the artificial noise may be reduced or eliminated using the CSI associated with the signal, or both. As an illustrative example, the base station may transmit the set of second signals to the authorized UE and the authorized UE may apply pseudo-noise signals (e.g., which may be the inverse of the pseudo-noise signals applied by the base station), based on the respective CSI, to the set of second signals including artificial noise to obtain a set of third signals without the artificial noise (e.g., with canceled or suppressed artificial noise). The authorized UE may combine the set of third signals to obtain a combined signal which the authorized UE may decode to obtain control information. In some cases, an unauthorized device may attempt to receive and decode the second set of signals transmitted from the base station to the authorized UE. However, the unauthorized device may be unsuccessful in receiving and decoding the second set of signals due to an inability to remove the artificial noise (e.g., the unauthorized device may not have access to the CSI used to generate and remove the artificial noise). In some cases, the unauthorized UE may be unable to remove the artificial noise due to lack of knowledge of the CSI for the channel between the base station and the unauthorized UE. For example, the base station may not cooperate or otherwise communicate with the unauthorized UE (e.g., the base station may not transmit a pilot preamble, among other signaling, to the unauthorized UE). Such cooperation may be used to establish or determine CSI, and thus the unauthorized UE may be unable to remove the artificial noise using the CSI due to being unaware of the CSI.

In some cases, the base station may repeat the multiple control channel transmissions including artificial noise (e.g., the set of second signals) in a frequency domain, a time domain, or both. For example, with frequency domain repetitions, the base station may transmit a first transmission at a first frequency and a second transmission at a second frequency, where the first transmission and the second transmission occur in the same time duration (e.g., within the same one or more symbols). Additionally or alternatively, with time domain repetitions the base station may transmit control channel transmissions at a same frequency but repeated in different time durations (e.g., repeated transmissions in each slot of multiple slots, or transmissions repeating in a same slot). In some examples, time domain repetitions occurring in a same time slot may be carried by different beams, which may result in improved channel diversity and relatively higher probability of successfully decoding the information at an authorized receiving device. In some examples, the base station may separate or otherwise configure control channel repetitions (e.g., a first transmission and a second transmission carrying the same control information payload) repeated in a frequency domain, time domain, or both, by a threshold value in the time domain or frequency domain, which may result in improved channel diversity and relatively higher probability of successfully decoding the information at an authorized receiving device.

Aspects of the disclosure are initially described in the context of wireless communications systems. Aspects of the disclose are then described in the context of a time domain transmission and a frequency domain transmission. Aspects of the disclosure are further illustrated by and described with reference to apparatus diagrams, system diagrams, and flowcharts that relate to techniques for channel state information based artificial noise injection.

FIG. 1 illustrates an example of a wireless communications system 100 that supports techniques for channel state information based artificial noise injection in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The wireless communications system 100 may support techniques for security protection of communications as described herein. For example, various devices (e.g., UEs 115, base stations 105, etc.) may communicate using control channel transmissions or other signaling (e.g., lower layer signaling) with artificial noise applied. For example, a base station may apply an artificial noise signal to a set of signals associated with control channel transmissions and transmit the control channel transmissions with artificial noise to an authorized UE. The artificial noise signal may be based on CSI associated with a channel for communications with the authorized UE, and may be generated using a pseudo-noise (e.g., pseudo-random noise) generator. The authorized UE may receive the control channel transmissions with artificial noise and apply pseudo-noise signals (e.g., the inverse of the artificial noise applied by the base station) to the transmissions to cancel or suppress the artificial noise. The pseudo-noise signals may be based on CSI of the respective resources associated with the control channel transmissions. The UE may combine the control channel transmissions based on the removing the artificial noise to obtain a combined signal, which the UE may decode to obtain control information. By implementing such techniques for artificial noise injection in signaling between two devices, an unauthorized device may be unable to intercept or successfully receive communications due to the artificial noise (e.g., the unauthorized device may be unable to remove the artificial noise because it is unaware or otherwise does not have CSI information used to generate the noise), lower power allocated to each repetition of the information, or a combination thereof.

Figure 2:
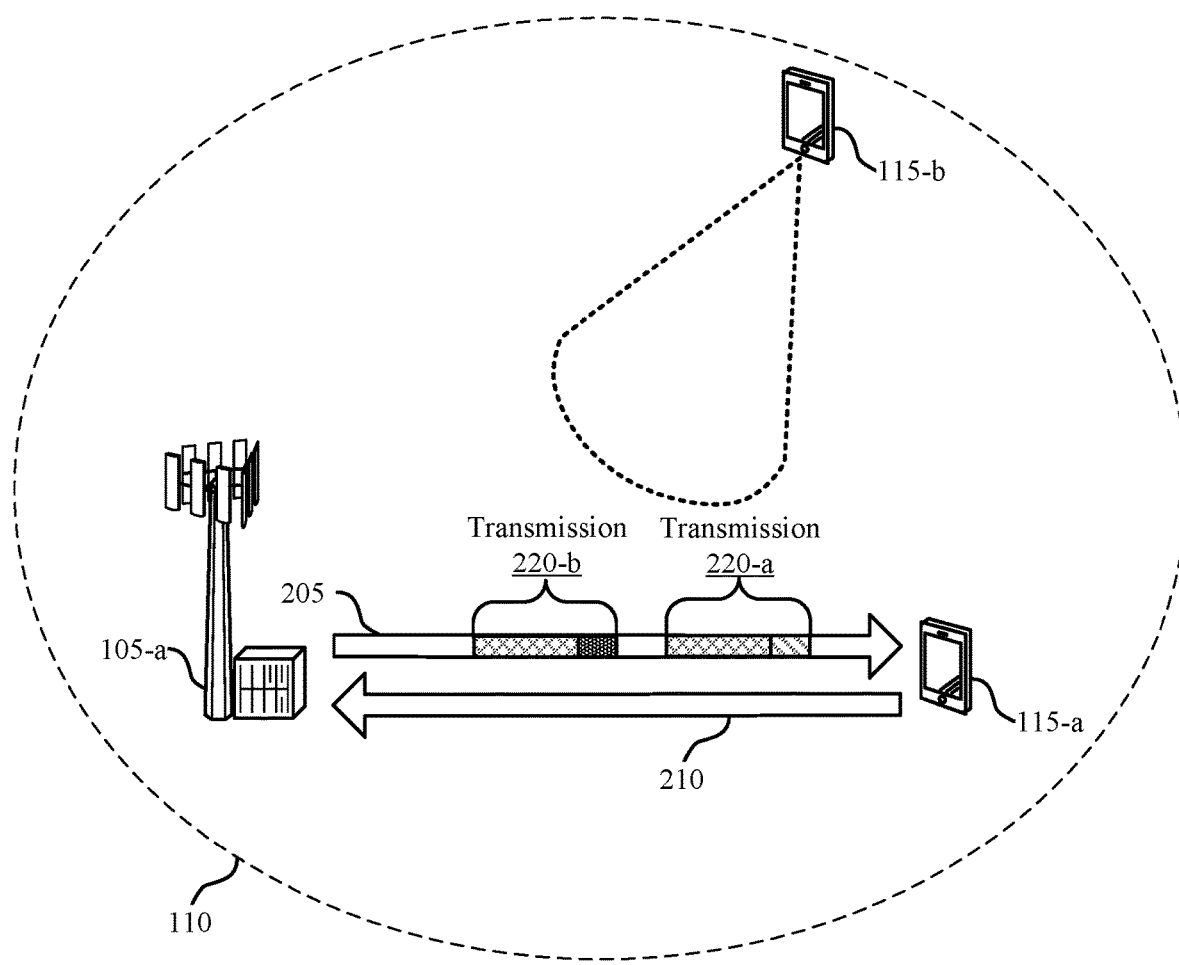
FIG. 2 illustrates an example of a wireless communications system that supports techniques for CSI based artificial noise injection in accordance with aspects of the present disclosure.

FIG. 2 illustrates an example of a wireless communications system 200 that supports techniques for channel state information based artificial noise injection in accordance with aspects of the present disclosure. In some examples, wireless communications system 200 may implement aspects of wireless communications system 100 and may include a UE 115-*a*, a UE 115-*b*, and a base station 105-*a*, which may be examples of UEs 115 and a base station 105 and may communicate with one another as described above with reference to FIG. 1. For example, the base station 105-*a* may transmit the downlink communications 205 to the UE 115-*a* via a communication link as described with reference to FIG. 1. The UE 115-*a* may transmit the uplink communications 210 to the base station 105-*a* via a respective communication link.

Although described as communications between UEs 115 and the base station 105-*a*, any type or quantity of devices may implement the techniques described herein. Further, the techniques described herein may be implemented by any type or quantity of devices of any wireless communications system.

In some cases, a wireless device (e.g., a base station 105-*a*, a UE 115-*a*, or both) may apply secure transmission protocols (e.g., upper-layer cryptographic functions) to downlink and uplink communications to support user privacy, data confidentiality and integrity, and to ensure availability of network services (e.g., against denial-of-service attacks). For example, the wireless device may encrypt a globally unique identifier (e.g., a subscription permanent identifier (SUPI)) during primary authentication to support user privacy. In some cases, the encryption may be done using encryption keys (e.g., a home-network public key). For example, a first wireless device may use a public key to encrypt the identifier and transmit the encrypted identifier to a second wireless device. The second wireless device may decrypt the identifier using a private key that is related to the public key (e.g., asymmetric key cryptography). Additionally or alternatively, the first wireless device and the second wireless device may use the same key (e.g., ciphering and integrity keys) to encrypt and decrypt the identifier during authentication (e.g., symmetric encryption). Therefore, the first wireless device and the second wireless device may support key sharing mechanisms to enable the wireless devices to transmit one or more keys between the wireless devices in a secure manner. Stated alternatively, the devices in the wireless communications system 200 may support security and cryptographic functionalities, for example, for upper layer communications (e.g., layer 3 (L3) signaling such as RRC communications), though it is to be understood that any of the techniques described herein may be applied to any layer of communications. Such techniques may protect communications from being successfully decoded or attacked by malicious devices.

In some cases, a wireless device may use encryption algorithms (e.g., AES-128, SNOW 3G and ZUC-128) to encrypt data (e.g., user plane data) and signaling (e.g., radio resource control (RRC) signaling) to support confidentiality and integrity protections. For example, the wireless device may use a 128-bit encryption algorithm, or encryption key with a length of 128-bits, to encrypt data or signaling prior to transmission. Therefore, if an adversary wireless device intercepts the data or signaling, it may be unable to decrypt the data or signaling.

However, in some cases the wireless communications system 200 may fail to support encryption techniques for relatively low level signaling (e.g., L1 signaling such as physical layer signaling, L2 signaling such as MAC, RLC, and PDCP signaling, and the like). For example, wireless devices may communicate control channel transmissions (e.g., DCI-based PDDCH, MAC CE, or a wake-up signal (WUS), among other examples). A wireless device may decode the control channel transmission (e.g., PDDCH) to obtain control information (e.g., DCI) and may use the control information to receive and decode a payload transmitted on a shared channel (e.g., physical downlink shared channel (PDSCH) transmission).

However, conventional security techniques (e.g., cryptographic algorithms used on upper layers) may not be suitable to provide security for control channel transmissions (e.g., they may only be implemented in the upper layers after RRC connection establishment), for example, due to increased overhead and reduced efficiency for applying the upper layer cryptographic algorithms to such communications. Therefore, an unauthorized wireless device, or a wireless device that is not the intended recipient of the control channel transmission, may successfully receive (e.g., capture or steal) and decode the control channel transmission to obtain the control information (e.g., to reveal confidential message contents). Additionally or alternatively, the unauthorized wireless device may perform an attack (e.g., adversary attack) on the control channel transmission, such as corrupting or modifying the control channel transmission or injecting a virus into the control channel transmission, among other malicious activities. Lack of security protections on the control channel transmissions may expose the wireless communications system to successful malicious activities resulting in a lack of confidentiality and integrity of the control channel transmissions. Additionally or alternatively, the successful malicious activity may result in failed or delayed reception or decoding of the control channel transmissions.

Accordingly, the wireless communications system 200 may support techniques for channel state information based artificial noise injection, which may provide a protection mechanism based on physical layer security. For example, the wireless communications system 200 may implement one or more information-theoretic security techniques, such as artificial noise injection, which may provide protection for communications based on information that authorized devices have that an unauthorized device may not have (e.g., information that is communicated securely in higher layer signaling such as CSI). In some examples, by implementing the information-theoretic security techniques, security may be increased for communications without relying on a difficulty of computational complexity to secure the communications (e.g., cryptographic techniques).

In some examples, the base station 105-*a* may apply a respective artificial noise signal to each of a set of first signals associated with multiple control channel transmissions (e.g., PDCCH) to obtain a set of second signals. The artificial noise signal may be generated based on a pseudo-noise (e.g., pseudo-random noise) generator function. In some examples, the artificial noise signal may be referred to as a pseudo-noise signal, or vice versa. In some cases, each signal of the set of first signals may indicate the same control information payload. Each signal of the set of second signals may include a respective artificial noise signal in addition to a respective signal of the first signals. For example, a base station 105-*a* may apply a respective artificial noise signal to a PDCCH 215 (e.g., a signal including a PDDCH payload) and transmit a transmission 220-*a* including artificial noise 225-*a* and apply a different respective artificial noise signal to the PDCCH 215 for the transmission 220-*b* including artificial noise 225-*b*. The transmissions 220 may be referred to as repeated transmissions 220 (e.g., the transmissions may be examples of PDCCH repetitions, where a same PDCCH payload is transmitted multiple times in the frequency domain, the time domain, or both). The respective artificial noise signal may be based on CSI for the resources associated with the respective control channel transmission. That is, an artificial noise signal for the transmission 220-*b* may be based on CSI for the channel used to transmit the transmission 220-*b* from the base station 105-*a* to a UE 115-*a*, which may be an example of an authorized receiver (e.g., the UE 115-*a* may have established a communications link with the base station 105-*a* as described with reference to FIG. 1, and the UE 115-*a* may be the intended recipient of the transmissions 220).

The base station 105-*a* may transmit the transmission 220-*a* and the transmission 220-*b* to the UE 115-*a*. The UE 115-*a* may receive the transmission 220-*a* and the transmission 220-*b* and apply a respective pseudo-noise signal (e.g., an inverse of the respective artificial noise signal applied by the base station 105-*a*) to each of the repeated transmissions 220 to remove the artificial noise 225 from each transmission producing a set of third signals. The respective pseudo-noise signal may be based on the CSI for the resources associated with the respective control channel transmission (e.g., a CSI associated with resources for the transmission 220-*a* may be used to generate a first pseudo-noise signal, CSI associated with second resources for the transmission 220-*b* may be used to generate a second pseudo-noise signal, and so on). Therefore, a pseudo-noise signal may correspond to the artificial noise signal applied to the respective signal of the control channel transmission (e.g., the pseudo-signal may be an inverse of the artificial noise signal which may enable the UE 115-*a* to remove the artificial noise 225 from the signal of a respective control channel transmission). The UE 115-*a* may combine (e.g., soft combine) the set of third signals to obtain a combined signal which the UE 115-*a* may successfully decode to obtain control information.

As discussed herein, a respective artificial noise signal may be based on CSI for the resources associated with a respective control channel transmission. That is, the respective artificial noise signals may be based on channel properties of the channels used to transmit the repeated transmissions 220 from the base station 105-*a* to the UE 115-*a*. In some examples, the artificial noise signals may be different for each control channel transmission due to different channel conditions (e.g., different CSI metrics for different resources). The channel properties may include one or more of a channel-quality indicator (CQI), a precoding matrix index (PMI), a rank indicator (RI), or various combinations of these parameters. For example, the artificial noise signal applied to the PDCCH 215 to obtain the transmission 220-*a*, including the artificial noise 225-*a*, may be based on the channel properties of the communication link used to transmit the transmission 220-*a* from the base station 105-*a* to the UE 115-*a*. As such, the artificial noise signal may be designed using the CSI of the UE 115-*a*. The UE 115-*a* may be able to successfully remove the artificial noise 225-*a* from the transmissions 220-*a* by applying a pseudo-noise signal based on the CSI. An unauthorized receiver, such as a UE 115-*b*, may be unable to successfully decode the transmissions 220-*a* due to relatively higher interference from the uneliminated, and in some cases amplified, artificial noise 225-*a* (e.g., the unauthorized receiver may soft combine the second set of signals with artificial noise, which may amplify the portions of the second set of signals that are artificial noise and thus lowering a probability of successfully decoding the portions of the second set of signals that indicate the control information).

As an illustrative example, for j control channel transmissions (e.g., j PDCCH blocks each associated with a PDCCH transmission) including a same PDCCH payload, the artificial noise signal for the j-th control channel transmission may be designed (e.g., calculated, configured, and the like) according to Equation 1.

$$z_j = e^{j\Theta_j} u_n / |h_j| \tag{1}$$

As described with respect to Equation 1, $h_j$ may represent the respective channel between the base station 105-*a* and the UE 115-*a* for the resources of block j (e.g., $h_j$ may be an example of or represent one or more channel metrics or properties, such as CSI), $u_n$ may represent a noise vector that may reduce (e.g., minimize) the peak-to-average-power ratio (PAPR) (e.g., a noise vector that results in a PAPR that satisfies a threshold), and $\theta_j$ may represent the phase value given for M values of M={2,3,4} as follows, for example, in Equations 2 through 4:

$$M=2 \rightarrow \theta_1=0, \theta_2=\pi \quad (2)$$

$$M=3 \rightarrow \theta_1=0, \theta_2=2\pi/3, \theta_3=4\pi/3 \quad (3)$$

$$M=4 \rightarrow \theta_1=0, \theta_2=\pi/2, \theta_3=\pi, \theta_4=3\pi/2 \quad (4)$$

where M is the total number of control channel transmissions in a set of multiple control channel transmissions (e.g., the control channel transmissions corresponding to the set of first signals). For example, the transmission 220-a and the transmission 220-b may be based on the PDCCH 215 and belong to the same set of signals resulting in M=2. In some cases, the base station 105-a may use additional rotations of the phase values around the origin. For example, M=2→$\theta_1$=2π, $\theta_2$=3π. The base station 105-a may design M>4 similarly. For example, the $\theta_j$ of M>4 may be determine according to Equation 5.

$$\theta_j = (j-1)\frac{2\pi}{M} \quad (5)$$

In some examples, each of the repeated transmissions 220 (e.g., each of the repeated blocks including a respective signal of the set of second signals) may contain the PDCCH 215 (e.g., the same original PDCCH payload in each repetition) with a different artificial noise 225 based on Equation 1. For example, a transmission 220-a may contain the PDCCH 215 and artificial noise 225-a while a transmission 220-b may contain the PDCCH 215 and artificial noise 225-b.

In some cases, devices may select (e.g., take) values for the artificial noise signal from a finite constellation (e.g., quadrature phase shift keying (QSPK) for PDCCH). That is, each symbol of the artificial noise signal (or the inverse of the artificial noise signal (e.g., pseudo-noise signal) on a receiver device) may be selected from a finite constellation. Additionally or alternatively, in some examples (e.g., examples where there may be no hardware limitations associated with transmitting continuous-valued signals), devices may select values for the artificial noise signal from anywhere on an in-phase and quadrature (IQ) plane. In some examples, the devices may select a random value which may improve a security performance.

In some examples, the base station 105-a may adjust the power allocated to an artificial noise signal per transmission. For example, an artificial noise signal applied to the PDCCH 215 to obtain the transmission 220-a may have a first power allocation and an artificial noise signal applied to the PDCCH 215 to obtain the transmission 220-b may have a second power allocation, where the first power allocation is greater than the second power allocation. In some cases, the power allocation may be based on one or more of a quality of service (QoS) threshold, a security threshold, a channel quality indicator (CQI), or any combination thereof. That is, the power allocated to each AN signal may be adjusted or readjusted per retransmission (e.g., per repetition of multiple PDCCHs) based on such thresholds or metrics. In some examples, the thresholds or metrics may be requested or indicated by a UE 115 to the network (e.g., the base station 105-a) via control signaling. Adjusting the power allocated to an artificial noise signal per transmission may support a balance of secure transmissions and network throughput (e.g., as a tradeoff).

Figure 3:
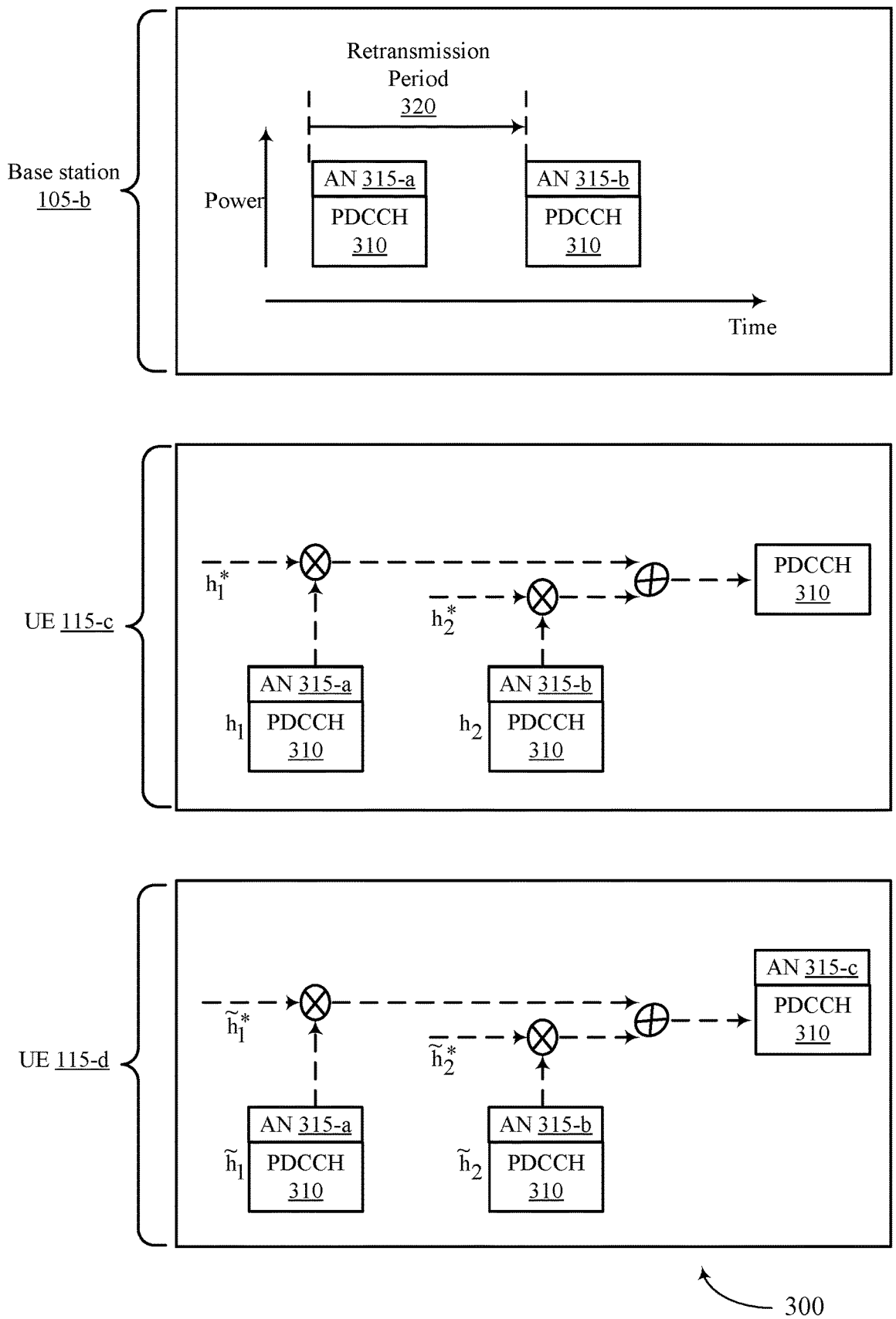
FIG. 3 illustrates an example of a time domain transmission that supports techniques for CSI based artificial noise injection in accordance with aspects of the present disclosure.

In some cases, the base station 105-a may transmit (e.g., repeat) the repeated transmissions 220 in the time domain, described with respects to FIG. 3. As such, the base station 105-a may transmit the transmission 220-a at a first time and the transmission 220-b at a second time. In some cases, such as low-latency operations, the base station 105-a may transmit the transmission 220-a and the transmission 220-b in a time slot (e.g., intra-slot repetition to reduce delay, for example, for low latency applications or data). In such cases, the base station 105-a may transmit the repeated transmissions 220 using different beams to support channel diversity. For example, the base station 105-a may transmit the transmission 220-a at a first time using a first beam and the transmission 220-b at a second time using a second beam.

In some cases, the base station 105-a may separate the transmissions 220 in the time domain (e.g., to the extent that the resources allow) by a threshold value to support time diversity and enhanced performance. For example, the time between transmission of the transmission 220-a and transmission of the transmission 220-b may satisfy (e.g., be greater than or equal to) the threshold value.

Figure 4:
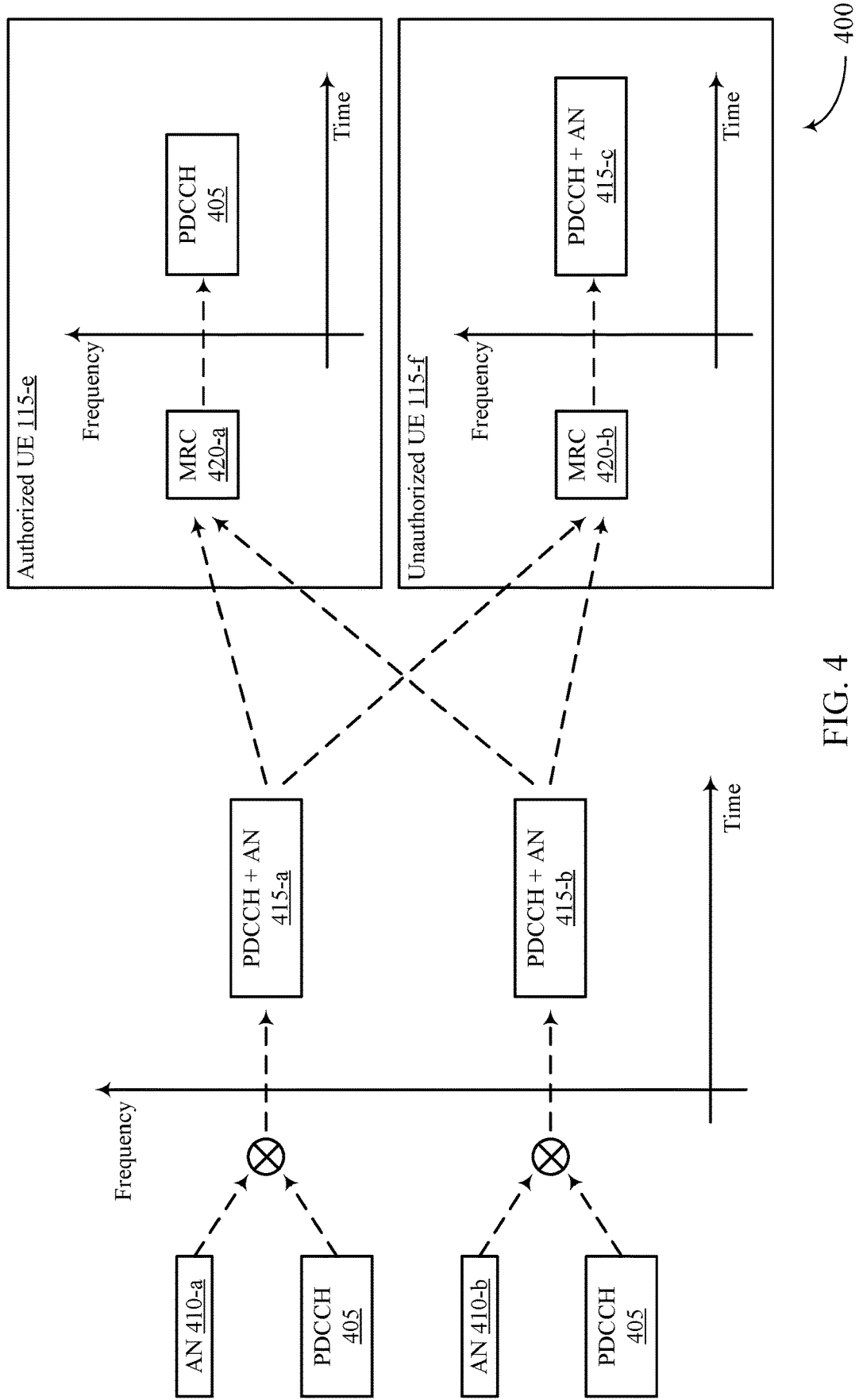
FIG. 4 illustrates an example of a frequency domain transmission that supports techniques for CSI based artificial noise injection in accordance with aspects of the present disclosure.

In some cases, the base station 105-a may transmit the repeated transmissions 220 in the frequency domain, as described with respect to FIG. 4. As such, the base station 105-a may transmit the transmission 220-a at a first frequency and the transmission 220-b at a second frequency. In some cases, the transmission 220-a and the transmission 220-b may span the same one or more consecutive OFDM symbols. That is, the transmission 220-a and the transmission 220-b may be transmitted in a same time duration but on different frequency resources. In some cases, the base station 105-a may separate the repeated transmissions 220 in the frequency domain (e.g., to the extent that the resources allow) to support frequency diversity and enhanced performance. For example, the difference in frequency between transmission of the transmission 220-a and transmission of the transmission 220-b may satisfy a threshold value.

Repeating transmissions 220 in the frequency domain (e.g., when there are sufficient resources), may result in improved efficiency as the UE 115-a may receive the transmissions 220 at the same time and may soft combine the transmissions 220 without delay (e.g., rather than waiting to receive the transmission 220-a at a first time and the transmission 220-b at a second time). Repeating transmissions 220 in the frequency domain may also support low-latency applications (ultra-low latency communications (URLLC)) and time critical control information formats (e.g., 0_x and 1_x family of DCI).

In some examples, the base station 105-a may reduce the aggregation level for each transmission 220 to inhibit increases to the use of spectral resources (e.g., due to the PDCCH 215 repetitions). As an illustrative example, instead of an aggregation level of 2 to carry DCI in a single PDCCH transmission, two PDCCH transmissions may be generated with an aggregation level of 1 for the same DCI (e.g., the DCI in each transmission 220 may have lower aggregation levels based on the repetition of the DCI, the quantity of repetitions, or both).

In some cases, the base station 105-a may allocate power to each of the transmissions 220 such that the total power is within a threshold (e.g., within a power budget). For example, the base station 105-a may allocate a first power to the transmissions 220-a and a second power to the transmissions 220-b, such that the combination of the first power and the second power is within a power threshold. In some cases, the power per repeated transmission 220 in the frequency domain may decrease. For example, the base station may transmit the transmission 220-*a* at a first frequency with a first power and the transmission 220-*b* at a second frequency with a second power, such that the first power is greater than the second power. In some cases, the increase in SNR via soft combining may compensate for the decrease in power. In some cases, lower power per transmission 220 may prevent the UE 115-*b*, which may be an unauthorized receiver, from attempting to decode the transmission 220-*a* or transmission 220-*b*. For example, due to the UE 115-*b* being unable to remove artificial noise from each transmission as described herein, the UE 115-*b* may soft combine the transmissions 220 (which may amplify the artificial noise) or the UE 115-*b* may attempt to decode a transmission 220 individual but may have a relatively low likelihood of success due to the repetitions each having a lower power than a single transmission 220 (without soft-combining).

In some examples, the UE 115-*a* may receive the transmissions 220 in the time or frequency domain and apply respective pseudo-noise signals to remove the artificial noise 225. The UE 115-*a* may determine a pseudo-noise signal to apply to a repeated transmission 220 such that it cancels out the artificial noise signal included in the repeated transmission 220. For example, the UE 115-*a* may receive the transmission 220-*a* with artificial noise 225-*a* associated with a set of CSI. The UE 115-*a* may determine (e.g., identify, design, generate) a pseudo-noise signal based on the associated set of CSI such that the UE 115-*a* may apply the pseudo-noise signal to the transmission 220-*a* to remove the artificial noise 225-*a*.

In some case, the UE 115-*a* may soft combine the repeated transmissions 220, or the set of transmissions belonging to a retransmission group, in the time or frequency domain based on removing the artificial noise. For example, the UE 115-*a* may apply the pseudo-signals to the received set of second signals to obtain a set of third signals (e.g., the set of first signals after the artificial noise signals are removed from the set of second signals). The UE 115-*a* may soft-combine the adjusted set of second signals (e.g., each signal of the set of third signals) to obtain a combined signal for decoding the DCI.

Soft combining may involve combining multiple transmissions containing the same DCI information, which may or may not be decodable, to produce a combined signal that may be decoded successfully. For example, the UE 115-*a* may store symbol information received in the PDCCH 215 from the transmission 220-*a*, including where the symbol information is insufficient to be independently decoded. The UE 115-*a* may also store (e.g., in a buffer) symbol information received in the PDCCH 215 from the transmission 220-*b*, including where the symbol information is insufficient to be independently decoded. The UE 115-*a* may combine the symbol information with insufficient information from both PDCCHs 215 in such a way that a combined PDCCH 215, or total signal, may be obtained and allow for decoding. For example, first symbol information from a first position in the PDCCH 215 obtained from the transmission 220-*a* may contain insufficient information for independently decoding and second symbol information from a second position in the PDCCH 215 obtained from the transmission 220-*b* may contain insufficient information for independently decoding. The UE 115-*a* may combine the first symbol information and the second symbol information to obtain the combined PDCCH 215 that may be successfully decoded.

In some cases, the output y of the soft combining, or the combined signal, may be given by Equation 6.

$$y = \sum_{j=1}^{M} \alpha_j \, [h_j(x + z_j) + w_j] \tag{6}$$

As described with respect to Equation 6, M may represent the number of transmissions (e.g., PDCCH blocks) to be soft combined, $\alpha_j = h_j^*/|h_j|$ may represent the weight for the j-th transmission, $h_j$ may represent the respective channel between the base station 105-*a* and the UE 115-*a*, $h_j^*$ may represent the conjugate transpose, or in some cases inverse, of $h_j$, x may represent the transmission payload, $w_j$ may represent the observation noise (e.g., noise in the channel that occurs separate from the artificial noise injection, for example, due to blockage, interference, and the like), and $z_j$ may represent the artificial noise signal for the j-th transmission as described herein. Soft combining may improve SNR in decoding the combined PDCCH 215 payload to obtain control information (e.g., DCI) with relatively high reliability. Additionally, soft combining may produce a combined PDCCH 215 without the artificial noise. In some cases, soft combining the repeated transmissions 220 may compensate for decreased error-correcting performance (e.g., over a single PDCCH 215 transmission) due to relatively small aggregation levels, for example, as a result of soft-combining increasing SNR.

In some cases, the base station 105-*a* may indicate to the UE 115-*a* the locations of the PDCCHs 215 belonging to the same retransmission group in search space sets and the UE 115-*a* may soft combine (e.g., via maximum-ratio combining (MRC)) the PDCCHs 215 based on the indication. For example, the base station 105-*a* may transmit control signaling indicating the locations of the PDCCHs 215 designated for soft-combining or otherwise indicating that the PDCCHs 215 belong to a group of PDCCHs 215 including at least a portion of a same payload. In some examples, the base station 105-*a* may set the locations of the PDCCHs 215 semi-statically in a control resource set (CORESET) (e.g., via RRC signaling). Setting the locations of the PDCCHs 215 semi-statically in a CORSET may enable the base station 105-*a* to improve CORESET resource utilization in multiuser environments.

In some cases, the UE 115-*a* may decode the combined PDCCH 215 to obtain control information. Decoding the combined PDCCH 215 after soft combining (e.g., decoding PDCCHs jointly rather than individually) may limit increases on blind decoding complexity. For example, the UE 115-*a* may blind decode the combined PDCCH 215 (e.g., one combined instance of the PDCCH 215) to obtain control information. In some cases, soft combining the repeated transmissions 220 may increase the signal to noise ratio (SNR) while decoding the control information which may result in increased reliability.

In some cases, the UE 115-*b*, which may be an adversary UE, may attempt to receive and decode the repeated transmissions 220. In some cases, the UE 115-*b* may attempt to decode the transmission 220-*a* and the transmission 220-*b* without soft combining (e.g., to limit amplification of the artificial noise 225-*a* and the artificial noise 225-*b*, due to lack of soft combining capability, or any combination thereof). Alternatively, the UE 115-*b* may attempt to soft combine the transmission 220-a and the transmission 220-b which may result in amplified noise due to combined artificial noise. The UE 115-b may unsuccessfully decode the transmission 220-a and transmission 220-b with or without soft combining (e.g., due to deteriorated signal to interference and noise ratio (SINR) as a result of the artificial noise), resulting in enhanced security and reliability of the communications. Stated alternatively, CSI based artificial noise injection may inhibit unauthorized UEs 115 from receiving and decoding control channel transmissions and may support robust and reliable reception of control channel transmissions, though it is to be understood any information known to authorized devices (in addition or alternative to CSI) may be used for the techniques described herein.

FIG. 3 illustrates an example of a time domain transmission 300 that supports techniques for channel state information based artificial noise injection in accordance with aspects of the present disclosure. In some examples, time domain transmission 300 may implement aspects of wireless communications system 100 and wireless communications system 200 and may include a UE 115-c, a UE 115-d, and a base station 105-b, which may be examples of UEs 115 and a base station 105 and may communicate with one another as described above with reference to FIG. 1. Generally, the time domain transmission 300 may illustrate an example of artificial noise injection for PDCCH repetitions in the time domain. For example, a base station 105-b may transmit a first transmission including a PDCCH 310 and artificial noise 315-a at a first time and a second transmission including a PDCCH 310 and artificial noise 315-b at a second time.

In some cases, the base station 105-b may repeat control channel transmissions in the time domain. That is, the base station 105-b may transmit a first control channel transmission via a channel $h_1$ at a first time and a second control channel transmission via a channel $h_2$ at a second time, where the first control channel transmission and the second control channel transmission belong to a set of control channel transmissions. For example, the base station 105-b may transmit a first transmission including a PDCCH 310 and artificial noise 315-a at a first time and a second transmission including a PDCCH 310 and artificial noise 315-b at a second time In some cases, the first control channel transmission and the second control channel transmission may be transmitted in the time domain and the frequency domain. For example, the base station 105-b may transmit a first transmission including a PDCCH 310 and artificial noise 315-a at a first time and a first frequency and a second transmission including a PDCCH 310 and artificial noise 315-b at a second time and a second frequency. In some examples, the second frequency may be the same frequency range as the first frequency.

In cases, the first control channel transmission and the second control channel transmission may be transmitted in a time slot. Additionally or alternatively, the time between the first control channel transmission and the second control channel transmission may satisfy a threshold. For example, the retransmission period 320 may satisfy a time threshold as described with reference to FIG. 2.

In some cases, the base station 105-b may apply a first artificial noise signal to the first control channel transmission, transmitted via a channel $h_1$, in which the artificial noise signal is based on CSI of the channel $h_1$. Additionally or alternatively, $h_1$ may be referred to as the CSI of the channel for transmitting the first control channel transmission. The base station 105-b may apply a second artificial noise signal to the second control channel transmission, transmitted via a channel $h_2$, in which the artificial noise signal is based on CSI of the channel $h_2$.

An authorized UE 115-c may receive the first control channel transmission, including the PDCCH 310 and artificial noise 315-a, via a channel $h_1$ at a first time. The authorized UE 115-c may apply a pseudo-noise signal $h_1^*$, based on CSI of the channel $h_1$, to the first transmission to remove the artificial noise 315-a. For example, the pseudo-noise signal may be the inverse of the AN 315-a applied to the PDCCH 310 by the base station. At a second time, the authorized UE 115-c may receive the second control channel transmission, including the PDCCH 310 and artificial noise 315-b, via a channel $h_2$. The authorized UE 115-c may apply a pseudo-noise signal $h_2^*$, based on CSI of the channel $h_2$, to the second transmission to remove the artificial noise 315-b. The authorized UE 115-b may soft combine the PDCCH 310 received via the channel $h_1$ and the PDCCH 310 received via the channel $h_2$ to obtain the combined PDCCH 310 (e.g., without the AN 315-a and AN 315-b), which the authorized UE 115-b may successfully decode. In some cases, the authorized UE 115-b may soft combine the time domain signals associated with the PDCCHs 310. For example, the authorized UE 115-b may soft combine the time domain signal associated with the PDCCH 310 received via the channel $h_1$ with the time domain signal associated with the PDCCH 310 received via the channel $h_2$. Additionally or alternatively, the authorized UE 115-b may soft combine the symbol information for the time domain signals associated with the PDCCHs 310 received via the multiple channels. For example, the authorized UE 115-b may soft combine the symbol information for the time domain signal associated with the PDCCH 310 received via the channel $h_1$ with the symbol information for time domain signal associated with the PDCCH 310 received via the channel $h_2$.

In some cases, an unauthorized UE 115-d may intercept the first control channel transmission, including the PDCCH 310 and artificial noise 315-a, via a channel $\tilde{h}_1$ at a first time. The authorized UE 115-c may attempt to apply a pseudo-noise signal $h_1^*$, based on the CSI of the channel $\tilde{h}_1$, to the first transmission to attempt to remove the artificial noise 315-a. At a second time, the unauthorized UE 115-d may intercept the second control channel transmission, including the PDCCH 310 and artificial noise 315-b, via a channel $\tilde{h}_2$. The unauthorized UE 115-d may apply a pseudo-noise signal $h_2^*$, based on the CSI of the channel $\tilde{h}_2$, to the second transmission to attempt to remove the artificial noise 315-b. However, the pseudo-noise signals applied by the unauthorized UE 115-d may not remove the artificial noises 31 due to the artificial noises 315 being associated with CSI for the channels $h_1$ and $h_2$ rather than $\tilde{h}_1$ and $\tilde{h}_2$. In some other examples, the unauthorized UE 115-d may fail to apply any pseudo-noise signals to the transmissions. Therefore, the unauthorized UE 115-d may soft combine the modified first control channel transmission and the modified second control channel transmission to obtain a transmission including the PDCCH 310 and an artificial noise 315-c. The unauthorized UE 115-d may experience a reduced likelihood of decoding the PDCCH 310 due to the artificial noise 315-c.

FIG. 4 illustrates an example of a frequency domain transmission 400 that supports techniques for channel state information based artificial noise injection in accordance with aspects of the present disclosure. In some examples, frequency domain transmission 400 may implement aspects of wireless communications system 100 and wireless communications system 200 and may include a UE 115-*e* and a UE 115-*f*, which may be examples of UEs 115 and may communicate with one another as described above with reference to FIG. 1. Generally, the frequency domain transmission 400 may illustrate an example of artificial noise injection for PDCCH repetitions in the frequency domain. For example, a base station 105-*b* may transmit a control channel transmission 415-*a* at a first frequency and a control channel transmission 415-*b* at a second frequency.

In some cases, a base station 105 may repeat control channel transmissions in the frequency domain. That is, the base station may apply artificial noise 410-*a*, based on CSI of the channel between the base station 105 and the UE 115-*e*, to a PDCCH 405 to obtain a control channel transmission 415-*a* and apply artificial noise 410-*b*, based on CSI of the channel between the base station 105 and the UE 115-*e*, to the PDCCH 405 to obtain a control channel transmission 415-*b*. In some cases, the UE 115-*e* may apply the artificial noise 410 in the time domain of the frequency domain. The base station 105 may transmit the control channel transmission 415-*a* at a first frequency and the control channel transmission 415-*b* at a second frequency, where the control channel transmission 415-*a* and the control channel transmission 415-*b* belong to a set of control channel transmissions.

In some cases, the control channel transmission 415-*a* and the control channel transmission 415-*b* may be transmitted in resources that differ in the time domain, the frequency domain, or both. For example, the base station 105 may transmit the control channel transmission 415-*a* at a first time and a first frequency and the control channel transmission 415-*b* at a second time and a second frequency.

An authorized UE 115-*e* may receive the control channel transmission 415-*a* and the control channel transmission 415-*b* and apply pseudo-noise signals, based on CSI of the channel between the base station 105 and the UE 115-*e*, to remove the artificial noise 410-*a* and the artificial noise 410-*b* respectively in the respective time domain or the respective frequency domain (e.g., based on whether the artificial noise 410 was applied in the time domain or the frequency domain). The authorized UE 115-*e* may soft combine the control channel transmission 415-*a* and the control channel transmission 415-*b* using MRC 420-*a* to obtain the combined PDCCH 415. For example, the authorized UE 115-*b* may transform the control channel transmission 415-*a* and the control channel transmission 415-*b* to the frequency domain (e.g., separately). The authorized UE 115-*b* may extract the symbol information from the control channel transmission 415-*a* in the frequency domain and the symbol information from the control channel transmission 415-*b* in the frequency domain. The authorized UE 115-*b* may soft combine the symbol information associated with the control channel transmission 415-*a* in the frequency domain with the symbol information associated with the control channel transmission 415-*b* in the frequency domain to obtain the combined PDCCH 415. In some examples, an artificial noise signal may be added in the frequency domain, the time domain, or both (e.g., to cancel artificial noise added by the transmitter). The authorized UE 115-*e* may decode the combined PDCCH 415 based on the soft combining.

In some cases, an unauthorized UE 115-*f* may intercept the control channel transmission 415-*a* and the control channel transmission 415-*b* and apply pseudo-noise signals to attempt to remove the artificial noise 410-*a* and the artificial noise 410-*b* respectively. However, the unauthorized UE 115-*f* may determine and apply the pseudo-noise signals based on the channel between the base station 105 and the UE 115-*f*. Therefore, the unauthorized UE 115-*f* will unsuccessfully remove the artificial noise 410-*a* and the artificial noise 410-*b* from the control channel transmission 415-*a* and the control channel transmission 415-*b* respectively. The authorized UE 115-*e* may soft combine the control channel transmission 415-*a* and the control channel transmission 415-*b* using MRC 420-*b* to obtain a control transmission 415-*c* which includes artificial noise. In some cases, the artificial noise may be amplified. The unauthorized UE 115-*f* may unsuccessfully decoder the control transmissions 415-*c* due to the artificial noise.

Figure 5:
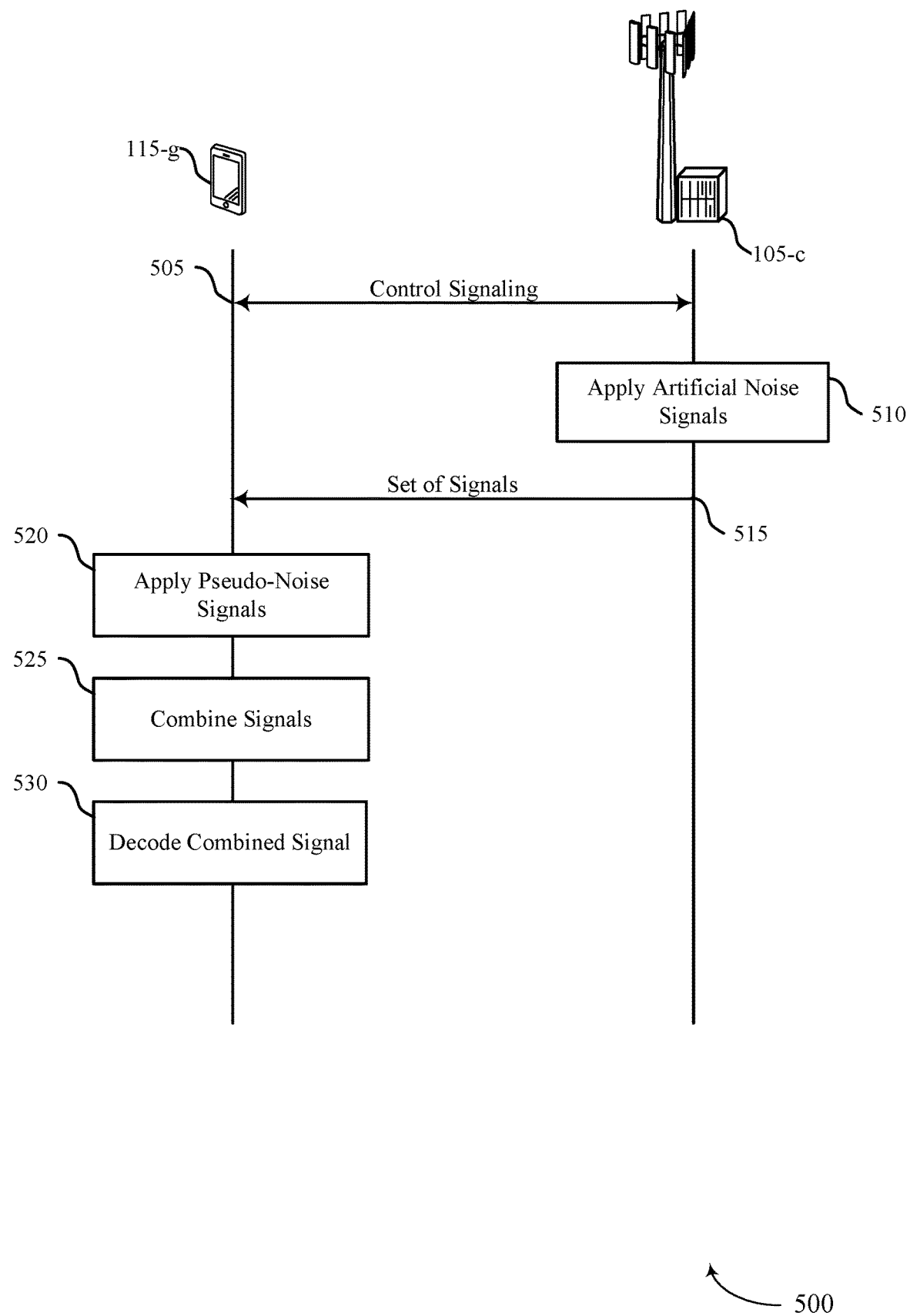
FIG. 5 illustrates an example of a process flow that supports techniques for CSI based artificial noise injection in accordance with aspects of the present disclosure.

FIG. 5 illustrates an example of a process flow 500 that supports techniques for channel state information based artificial noise injection in accordance with aspects of the present disclosure. In some examples, process flow 500 may implement aspects of wireless communications system 100, wireless communications system 200, time domain transmission 300, frequency domain transmission 400, and may include a UE 115-*g* and a base station 105-*c*, which may be examples of a UE 115 and a base station 105 and may communicate with one another as described above with reference to FIG. 1.

At 505, the UE 115-*g* may communicate control signaling with the base station 105-*c*. For example, the UE 115-*g* may transmit control signaling indicating CSI associated with a channel for communications with the UE 115-*g*. That is, the UE 115-*g* may transmit an indication of channel properties including one or more of a channel-quality indicator (CQI), a precoding matrix index (PMI), a rank indicator (RI), or combinations of these parameters. As an example, the base station may transmit reference signals (e.g., CSI reference signals) and the UE may report the CSI based on receiving the reference signals (e.g., the UE may transmit a CSI report indicating one or more of the various channel metrics such as CQI). In some cases, the base station 105-*c* may transmit control signaling indicating resources for a set of first signals in one or more search space sets as described herein with reference to FIG. 2. In some cases, the control signaling may comprise RRC signaling.

At 510, the base station 105-*c* may apply a respective artificial noise signal to each signal of a set of first signals to generate a set of second signals that are adjusted to include the artificial noise in each respective signal. A respective artificial noise signal may be based on the CSI of the resources associated with the channel for a control channel transmission. In some cases, a value for each artificial noise signal may be associated with a constellation point from a finite constellation or a constellation point from anywhere on an in-phase and quadrature (IQ) plane (e.g., a random constellation point). In some cases, the base station 105-*c* may allocate a power to each artificial noise signal based on a CQI, a QoS threshold, a security threshold, or a combination thereof. As an illustrative example, the base station 105-*c* may allocate relatively less power to a signal if the CQI is relatively poor for the channel carrying that signal (e.g., to maintain or improve a reliability of the transmissions), the base station 105-*c* may allocate relatively more power to a signal with a channel associated with a higher level of security (e.g., to satisfy a security threshold), or both, among other examples of allocating power based on the CQI, QoS, and security thresholds.

At 515, the base station 105-*c* may transmit the set of signals with artificial noise to the UE 115-*g*. In some cases, the signals of the set of signals may be repeated in a frequency domain, a time domain, or both based on a DCI format, one or more latency thresholds, or a combination thereof. In some cases, a first subset of signals of the set of signals may be separated from a second subset of signals of the set of signals by a value in the time domain, the frequency domain, or a combination thereof. The value may satisfy a threshold value in the time domain, the frequency domain, or a combination thereof. In some cases, the set of signals may be repeated in a single slot of the time domain and each signal of the set of signals may be transmitted using a different beam. In some cases, the set of signals may be repeated in the frequency domain and may be associated with an aggregation level. The aggregation level may be based on the quantity of repetitions of signals in the set of signals. In some cases, the aggregation level may include a first aggregation level for a first quantity of repetitions and a second aggregation level for a second quantity of repetitions.

At 520, the UE 115-*g* may apply a respective pseudo-noise signal to each signal in the set of signals to remove the artificial noise from each signal. The respective pseudo-noise signal may be based on the CSI of the respective resources associated with the channel(s) used to transmit the set of signals.

At 525, the UE 115-*g* may combine the set of signals based on removing the artificial noise to obtain a combined signal. In some cases, the UE 115-*g* may sum the set of signals according to respective weight factors for the set of signals as described with reference to FIGS. 3 and 4. For example, the UE 115-*g* may transform each signal of the set of signals to the frequency domain and extract the symbol information from each signal of the set of signals in the frequency domain. The UE 115-*g* may soft combine the symbol information associated each signal of the set of signals in the frequency domain to obtain a combined signal. In another example, the UE 115-*g* may transform each signal of the set of signals to the time domain and extract the symbol information from each signal of the set of signals in the time domain. The UE 115-*g* may soft combine the symbol information associated each signal of the set of signals in the time domain to obtain a combined signal.

At 530, the UE 115-*g* may decode the combined signal to obtain control information of the control channel candidate.

Figure 6:
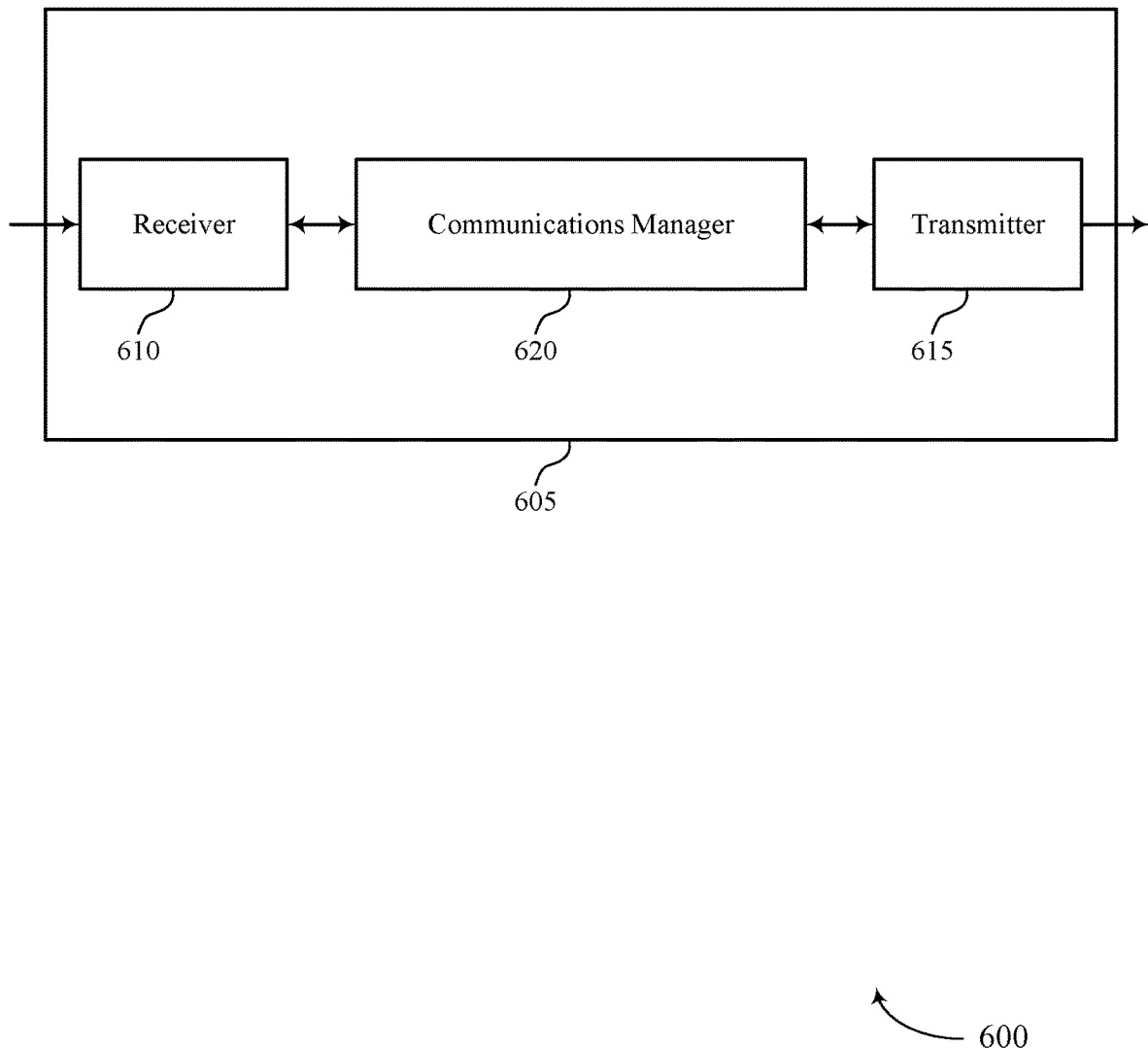
FIGS. 6 and 7 show block diagrams of devices that support techniques for CSI based artificial noise injection in accordance with aspects of the present disclosure.

FIG. 6 shows a block diagram 600 of a device 605 that supports techniques for channel state information based artificial noise injection in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for channel state information based artificial noise injection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for channel state information based artificial noise injection). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for channel state information based artificial noise injection as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving a set of first signals associated with a set of multiple control channel transmissions of a control channel candidate. The communications manager 620 may be configured as or otherwise support a means for applying respective pseudo-noise signals to the set of multiple control channel transmissions to obtain a set of second signals, where the respective pseudo-noise signals are based on channel state information of respective resources associated with the set of multiple control channel transmissions. The communications manager 620 may be configured as or otherwise support a means for combining the set of second signals for the set of multiple control channel transmissions to obtain a combined signal. The communications manager 620 may be configured as or otherwise support a means for decoding the combined signal to obtain control information of the control channel candidate.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for CSI based artificial noise injection. For example, the device 605 may communicate signaling with artificial noise based on CSI associated with an authorized device, which may be removed or reduced using the CSI. By applying and removing artificial noise using CSI, authorized devices may realize increased security and reliability, among other benefits.

Figure 7:
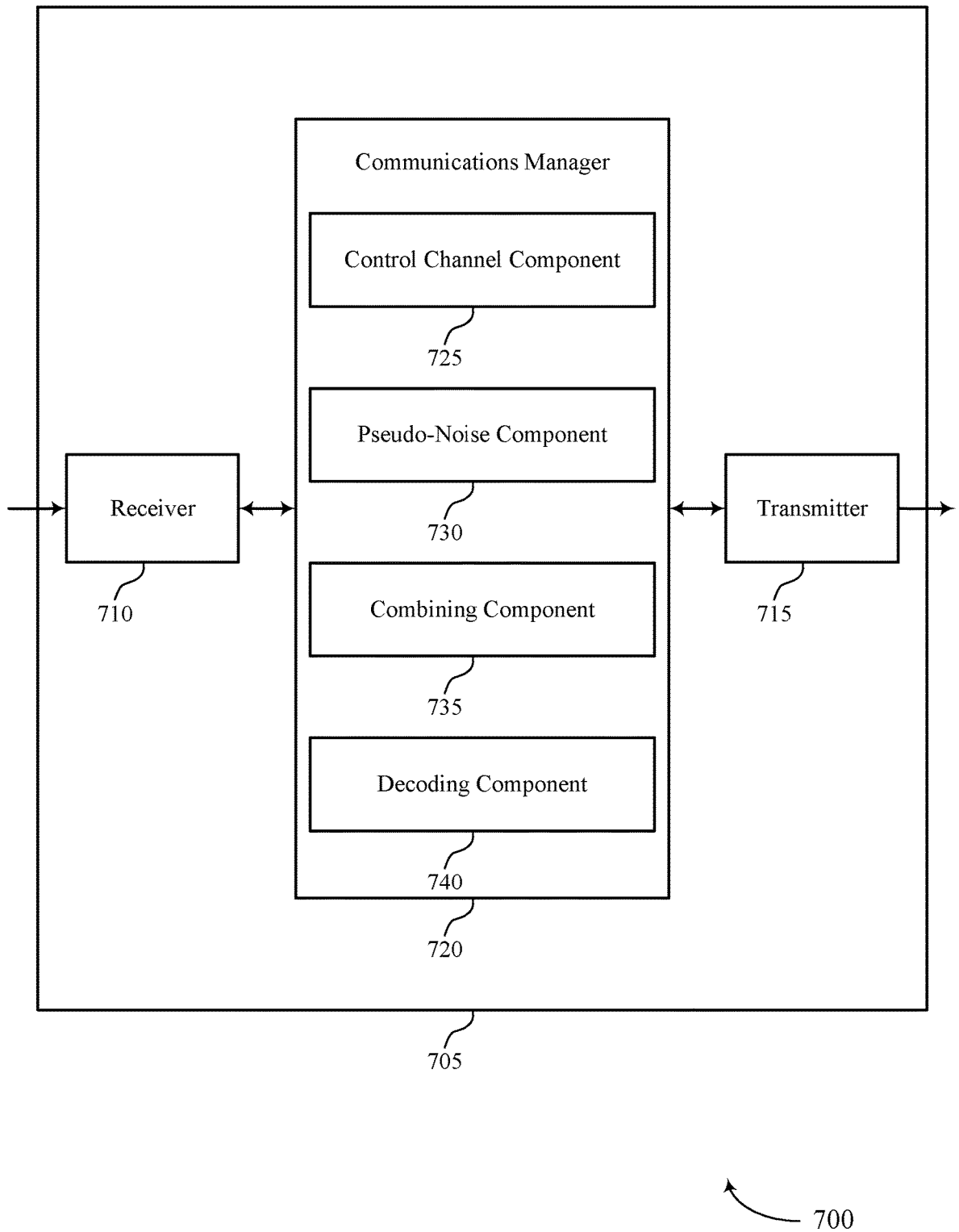

FIG. 7 shows a block diagram 700 of a device 705 that supports techniques for channel state information based artificial noise injection in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for channel state information based artificial noise injection). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for channel state information based artificial noise injection). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for channel state information based artificial noise injection as described herein. For example, the communications manager 720 may include a control channel component 725, a pseudo-noise component 730, a combining component 735, a decoding component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The control channel component 725 may be configured as or otherwise support a means for receiving a set of first signals associated with a set of multiple control channel transmissions of a control channel candidate. The pseudo-noise component 730 may be configured as or otherwise support a means for applying respective pseudo-noise signals to the set of multiple control channel transmissions to obtain a set of second signals, where the respective pseudo-noise signals are based on channel state information of respective resources associated with the set of multiple control channel transmissions. The combining component 735 may be configured as or otherwise support a means for combining the set of second signals for the set of multiple control channel transmissions to obtain a combined signal. The decoding component 740 may be configured as or otherwise support a means for decoding the combined signal to obtain control information of the control channel candidate.

Figure 8:
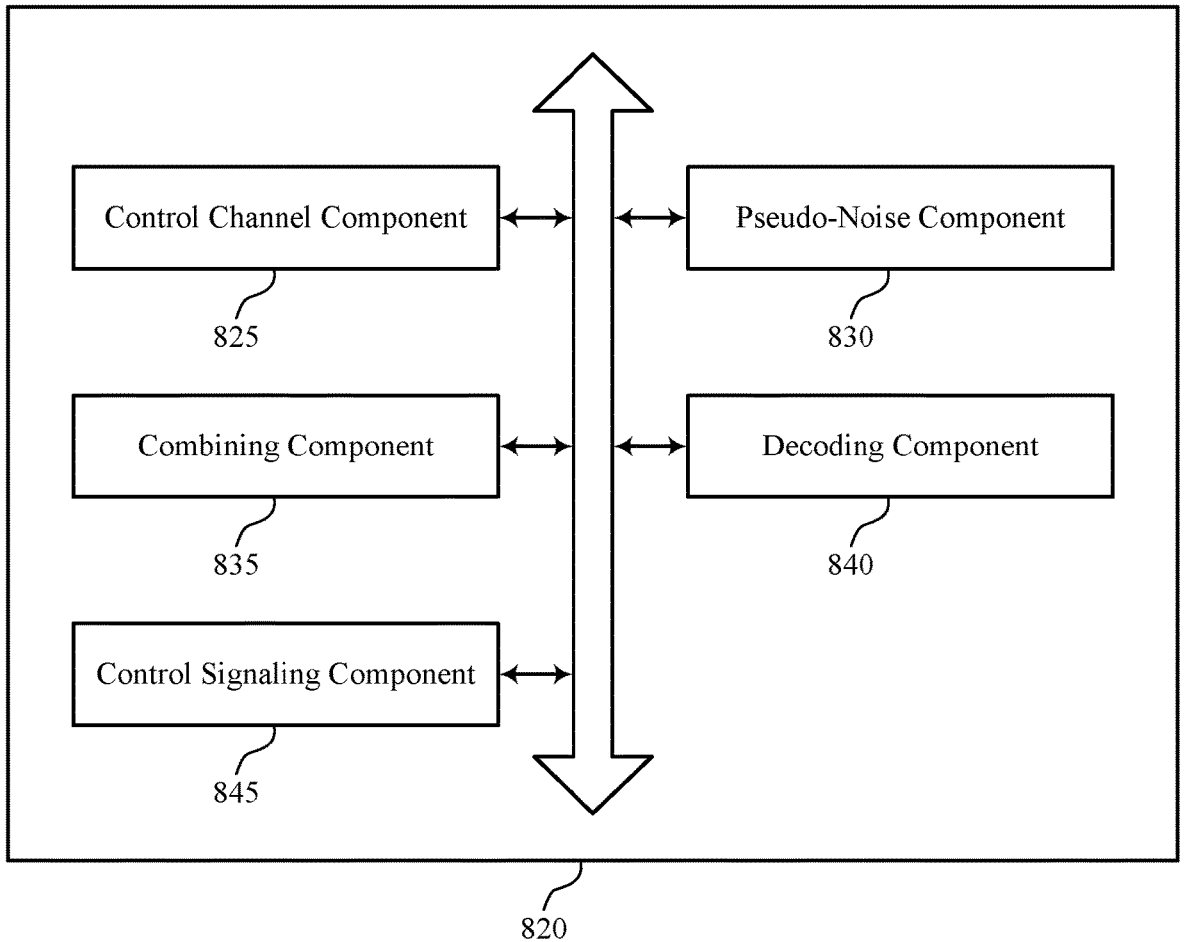
FIG. 8 shows a block diagram of a communications manager that supports techniques for CSI based artificial noise injection in accordance with aspects of the present disclosure.

FIG. 8 shows a block diagram 800 of a communications manager 820 that supports techniques for channel state information based artificial noise injection in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for channel state information based artificial noise injection as described herein. For example, the communications manager 820 may include a control channel component 825, a pseudo-noise component 830, a combining component 835, a decoding component 840, a control signaling component 845, or any combination thereof. Each of these components may communicate, directly or indirectly, with one another (e.g., via one or more buses).

The communications manager 820 may support wireless communications at a UE in accordance with examples as disclosed herein. The control channel component 825 may be configured as or otherwise support a means for receiving a set of first signals associated with a set of multiple control channel transmissions of a control channel candidate. The pseudo-noise component 830 may be configured as or otherwise support a means for applying respective pseudo-noise signals to the set of multiple control channel transmissions to obtain a set of second signals, where the respective pseudo-noise signals are based on channel state information of respective resources associated with the set of multiple control channel transmissions. The combining component 835 may be configured as or otherwise support a means for combining the set of second signals for the set of multiple control channel transmissions to obtain a combined signal. The decoding component 840 may be configured as or otherwise support a means for decoding the combined signal to obtain control information of the control channel candidate.

In some examples, to support combining the set of second signals, the combining component 835 may be configured as or otherwise support a means for summing the set of second signals for the set of multiple control channel transmissions according to respective weight factors for the set of multiple control channel transmissions.

In some examples, the control channel component 825 may be configured as or otherwise support a means for receiving the set of multiple control channel transmissions via downlink control channel resource blocks that are repeated in a frequency domain, a time domain, or both, based on a downlink control information format, one or more latency thresholds, or a combination thereof.

In some examples, at least a first subset of the downlink control channel resource blocks are separated from at least a second subset of the downlink control channel resource blocks by a threshold value in the time domain, the frequency domain, or a combination thereof.

In some examples, the control channel component 825 may be configured as or otherwise support a means for receiving the set of multiple control channel transmissions via downlink control channel resource blocks that are repeated in a single slot of a time domain, where each downlink control channel resource block is transmitted using a different beam.

In some examples, the control channel component 825 may be configured as or otherwise support a means for receiving the set of multiple control channel transmissions via downlink control channel resource blocks, that are repeated in a frequency domain, where the set of multiple control channel transmissions are associated with an aggregation level of a set of aggregation levels that is based on a quantity of repetitions of the set of multiple control channel transmissions.

In some examples, the aggregation level includes a first aggregation level for a first quantity of repetitions or a second aggregation level for a second quantity of repetitions.

In some examples, a power allocated to each control channel transmission is based on a channel quality indicator, a quality of service threshold, a security threshold, or any combination thereof.

In some examples, the control signaling component 845 may be configured as or otherwise support a means for receiving control signaling indicating resources for the set of multiple control channel transmissions in one or more search space sets.

In some examples, the control signaling includes radio resource control signaling.

In some examples, each symbol of a respective noise signal included in a respective control channel transmission has a value associated with a constellation point from a finite constellation or a random constellation point.

Figure 9:
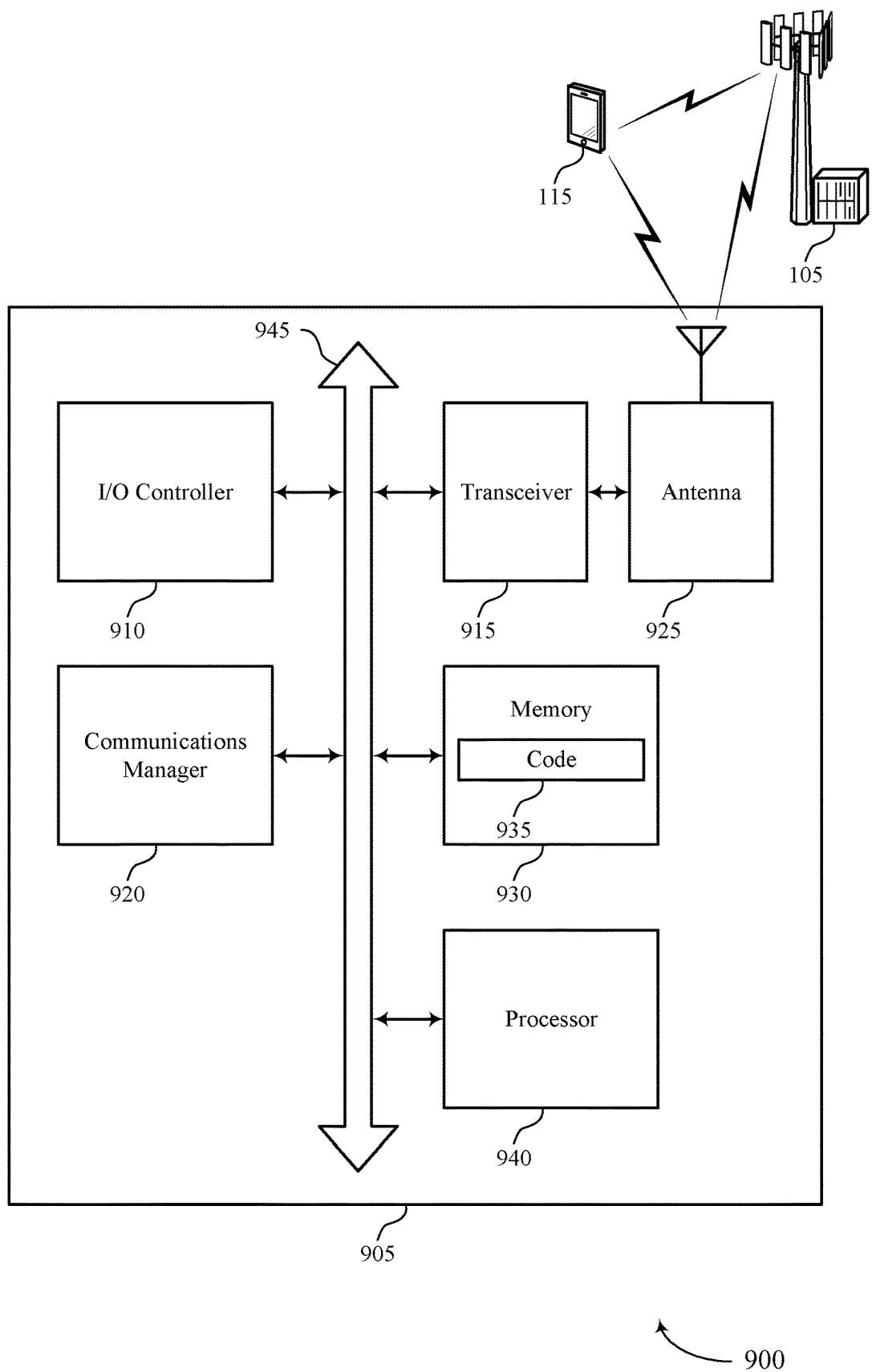
FIG. 9 shows a diagram of a system including a device that supports techniques for CSI based artificial noise injection in accordance with aspects of the present disclosure.

FIG. 9 shows a diagram of a system 900 including a device 905 that supports techniques for channel state information based artificial noise injection in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for channel state information based artificial noise injection). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a set of first signals associated with a set of multiple control channel transmissions of a control channel candidate. The communications manager 920 may be configured as or otherwise support a means for applying respective pseudo-noise signals to the set of multiple control channel transmissions to obtain a set of second signals, where the respective pseudo-noise signals are based on channel state information of respective resources associated with the set of multiple control channel transmissions. The communications manager 920 may be configured as or otherwise support a means for combining the set of second signals for the set of multiple control channel transmissions to obtain a combined signal. The communications manager 920 may be configured as or otherwise support a means for decoding the combined signal to obtain control information of the control channel candidate.

By including or configuring the communications manager 920 in accordance with examples as described herein, the device 905 may support techniques for CSI based artificial noise injection. For example, the device 905 may communicate signaling with artificial noise based on CSI associated with an authorized device, which may be removed or reduced using the CSI. By applying and removing artificial noise using CSI, authorized devices may realize increased security and reliability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for channel state information based artificial noise injection as described herein, or the processor 940 and the memory 930 may be otherwise configured to perform or support such operations.

Figure 10:
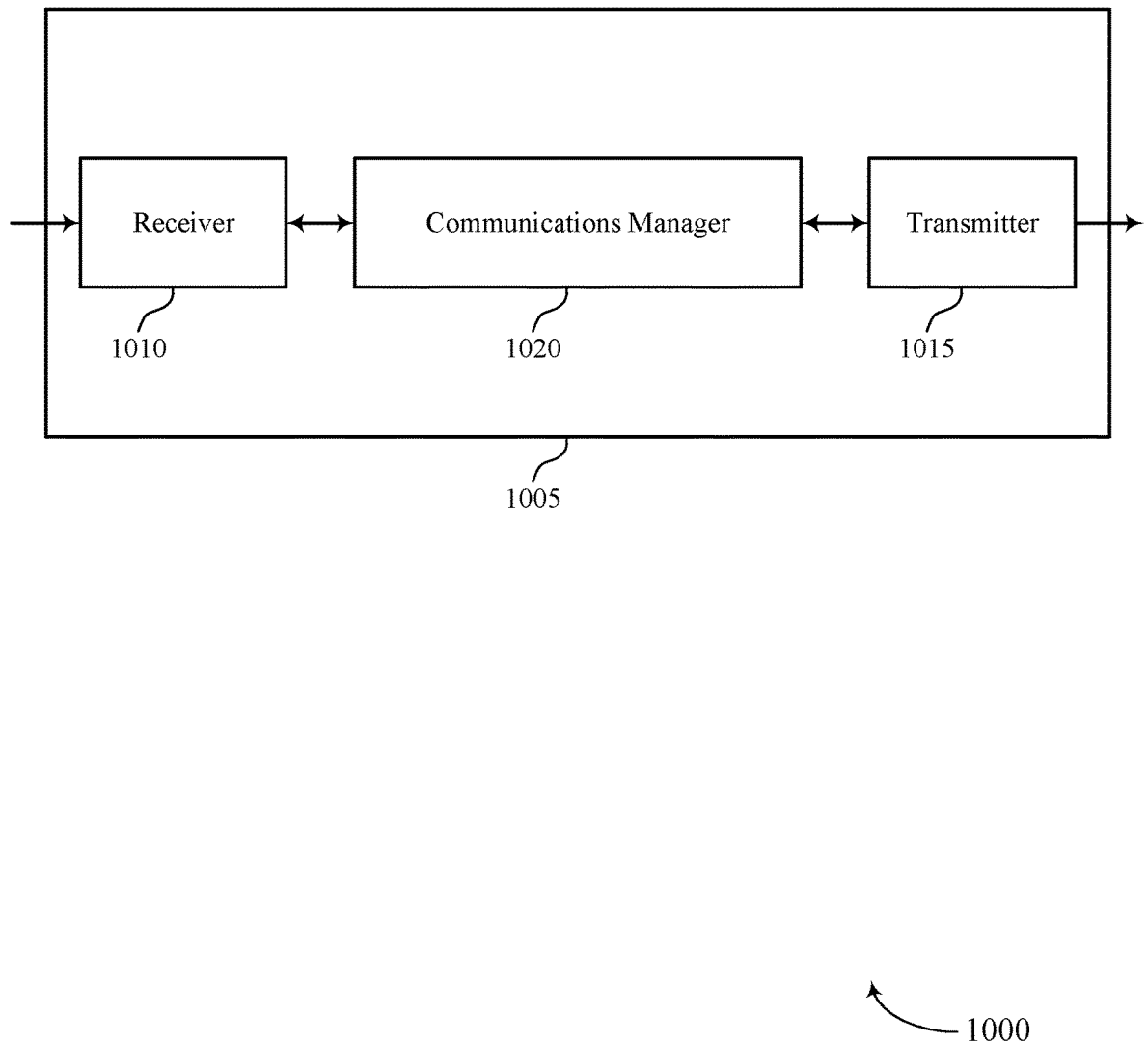
FIGS. 10 and 11 show block diagrams of devices that support techniques for CSI based artificial noise injection in accordance with aspects of the present disclosure.

FIG. 10 shows a block diagram 1000 of a device 1005 that supports techniques for channel state information based artificial noise injection in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for channel state information based artificial noise injection). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for channel state information based artificial noise injection). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for channel state information based artificial noise injection as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for receiving control signaling indicating channel state information associated with a channel for communications with a UE. The communications manager 1020 may be configured as or otherwise support a means for applying, to each signal of a set of first signals associated with a set of multiple control channel transmissions of a control channel candidate, a respective pseudo-noise signal to obtain a set of second signals, where the respective pseudo-noise signals are based on the channel state information of respective resources associated with the set of multiple control channel transmissions. The communications manager 1020 may be configured as or otherwise support a means for transmitting, to the UE, the set of second signals for the set of multiple control channel transmissions.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for CSI based artificial noise injection. For example, the communications manager 1020 may communicate signaling with artificial noise based on CSI associated with an authorized device, which may be removed or reduced using the CSI. By applying and removing artificial noise using CSI, authorized devices may realize increased security and reliability, among other benefits.

Figure 11:
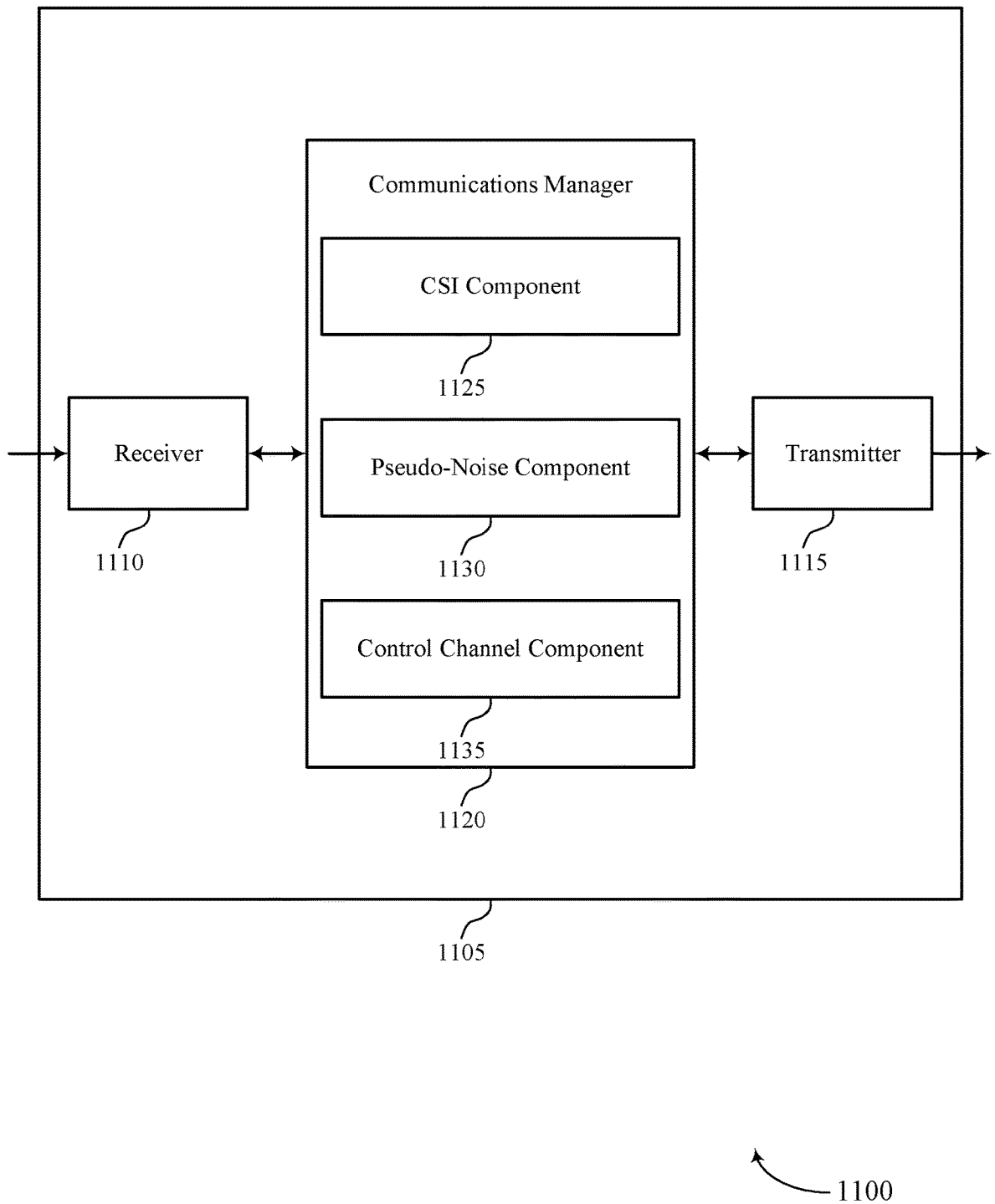

FIG. 11 shows a block diagram 1100 of a device 1105 that supports techniques for channel state information based artificial noise injection in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for channel state information based artificial noise injection). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for channel state information based artificial noise injection). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for channel state information based artificial noise injection as described herein. For example, the communications manager 1120 may include a CSI component 1125, a pseudo-noise component 1130, a control channel component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The CSI component 1125 may be configured as or otherwise support a means for receiving control signaling indicating channel state information associated with a channel for communications with a UE. The pseudo-noise component 1130 may be configured as or otherwise support a means for applying, to each signal of a set of first signals associated with a set of multiple control channel transmissions of a control channel candidate, a respective pseudo-noise signal to obtain a set of second signals, where the respective pseudo-noise signals are based on the channel state information of respective resources associated with the set of multiple control channel transmissions. The control channel component 1135 may be configured as or otherwise support a means for transmitting, to the UE, the set of second signals for the set of multiple control channel transmissions.

Figure 12:
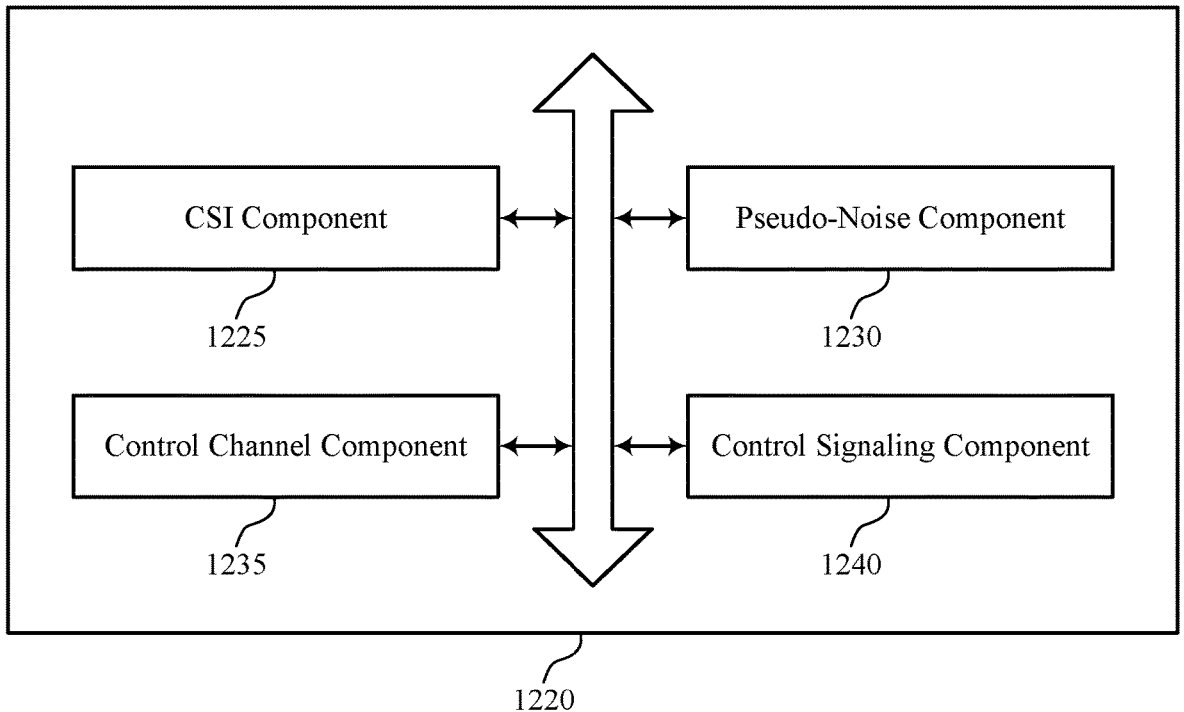
FIG. 12 shows a block diagram of a communications manager that supports techniques for CSI based artificial noise injection in accordance with aspects of the present disclosure.

FIG. 12 shows a block diagram 1200 of a communications manager 1220 that supports techniques for channel state information based artificial noise injection in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for channel state information based artificial noise injection as described herein. For example, the communications manager 1220 may include a CSI component 1225, a pseudo-noise component 1230, a control channel component 1235, a control signaling component 1240, or any combination thereof. Each of these components may communicate, directly or indirectly, with one another (e.g., via one or more buses).

The communications manager 1220 may support wireless communications at a base station in accordance with examples as disclosed herein. The CSI component 1225 may be configured as or otherwise support a means for receiving control signaling indicating channel state information associated with a channel for communications with a UE. The pseudo-noise component 1230 may be configured as or otherwise support a means for applying, to each signal of a set of first signals associated with a set of multiple control channel transmissions of a control channel candidate, a respective pseudo-noise signal to obtain a set of second signals, where the respective pseudo-noise signals are based on the channel state information of respective resources associated with the set of multiple control channel transmissions. The control channel component 1235 may be configured as or otherwise support a means for transmitting, to the UE, the set of second signals for the set of multiple control channel transmissions.

In some examples, the control channel component 1235 may be configured as or otherwise support a means for transmitting the set of multiple control channel transmissions via downlink control channel resource blocks that are repeated in a frequency domain, a time domain, or both, based on a downlink control information format, one or more latency thresholds, or a combination thereof.

In some examples, at least a first subset of the downlink control channel resource blocks are separated from at least a second subset of the downlink control channel resource blocks by a threshold value in the time domain, the frequency domain, or a combination thereof.

In some examples, the control channel component 1235 may be configured as or otherwise support a means for transmitting the set of multiple control channel transmissions via downlink control channel resource blocks that are repeated in a single slot of a time domain, where each downlink control channel resource block is transmitted using a different beam.

In some examples, the control channel component 1235 may be configured as or otherwise support a means for transmitting the set of multiple control channel transmissions via downlink control channel resource blocks that are repeated in a frequency domain, where the set of multiple control channel transmissions are associated with an aggregation level of a set of aggregation levels that is based on a quantity of repetitions of the set of multiple control channel transmissions.

In some examples, the aggregation level includes a first aggregation level for a first quantity of repetitions or a second aggregation level for a second quantity of repetitions.

In some examples, the control channel component 1235 may be configured as or otherwise support a means for allocating a power to each control channel transmission based on a channel quality indicator, a quality of service threshold, a security threshold, or any combination thereof.

In some examples, the control signaling component 1240 may be configured as or otherwise support a means for transmitting control signaling indicating resources for the set of multiple control channel transmissions in one or more search space sets.

In some examples, the control signaling includes radio resource control signaling.

In some examples, the pseudo-noise component 1230 may be configured as or otherwise support a means for selecting a value for each respective pseudo-noise signal, the value associated with a constellation point from a finite constellation or a random constellation point.

Figure 13:
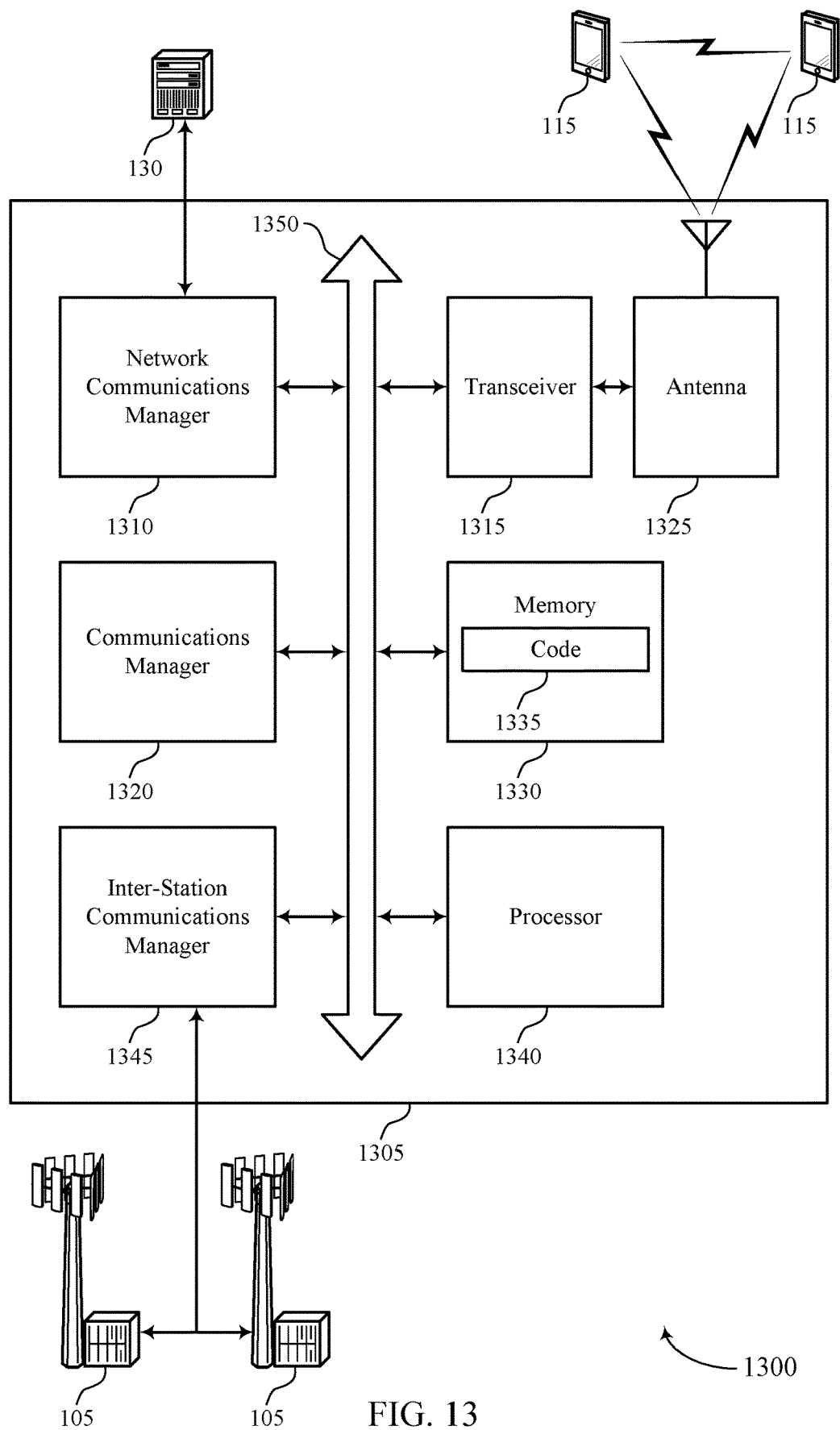
FIG. 13 shows a diagram of a system including a device that supports techniques for CSI based artificial noise injection in accordance with aspects of the present disclosure.

FIG. 13 shows a diagram of a system 1300 including a device 1305 that supports techniques for channel state information based artificial noise injection in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for channel state information based artificial noise injection). For example, the device 1305 or a component of the device 1305 may include a processor 1340 and memory 1330 coupled with or to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for receiving control signaling indicating channel state information associated with a channel for communications with a UE. The communications manager 1320 may be configured as or otherwise support a means for applying, to each signal of a set of first signals associated with a set of multiple control channel transmissions of a control channel candidate, a respective pseudo-noise signal to obtain a set of second signals, where the respective pseudo-noise signals are based on the channel state information of respective resources associated with the set of multiple control channel transmissions. The communications manager 1320 may be configured as or otherwise support a means for transmitting, to the UE, the set of second signals for the set of multiple control channel transmissions.

By including or configuring the communications manager 1320 in accordance with examples as described herein, the device 1305 may support techniques for CSI based artificial noise injection. For example, the device 1305 may communicate signaling with artificial noise based on CSI associated with an authorized device, which may be removed or reduced using the CSI. By applying and removing artificial noise using CSI, authorized devices may realize increased security and reliability, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for channel state information based artificial noise injection as described herein, or the processor 1340 and the memory 1330 may be otherwise configured to perform or support such operations.

Figure 14:
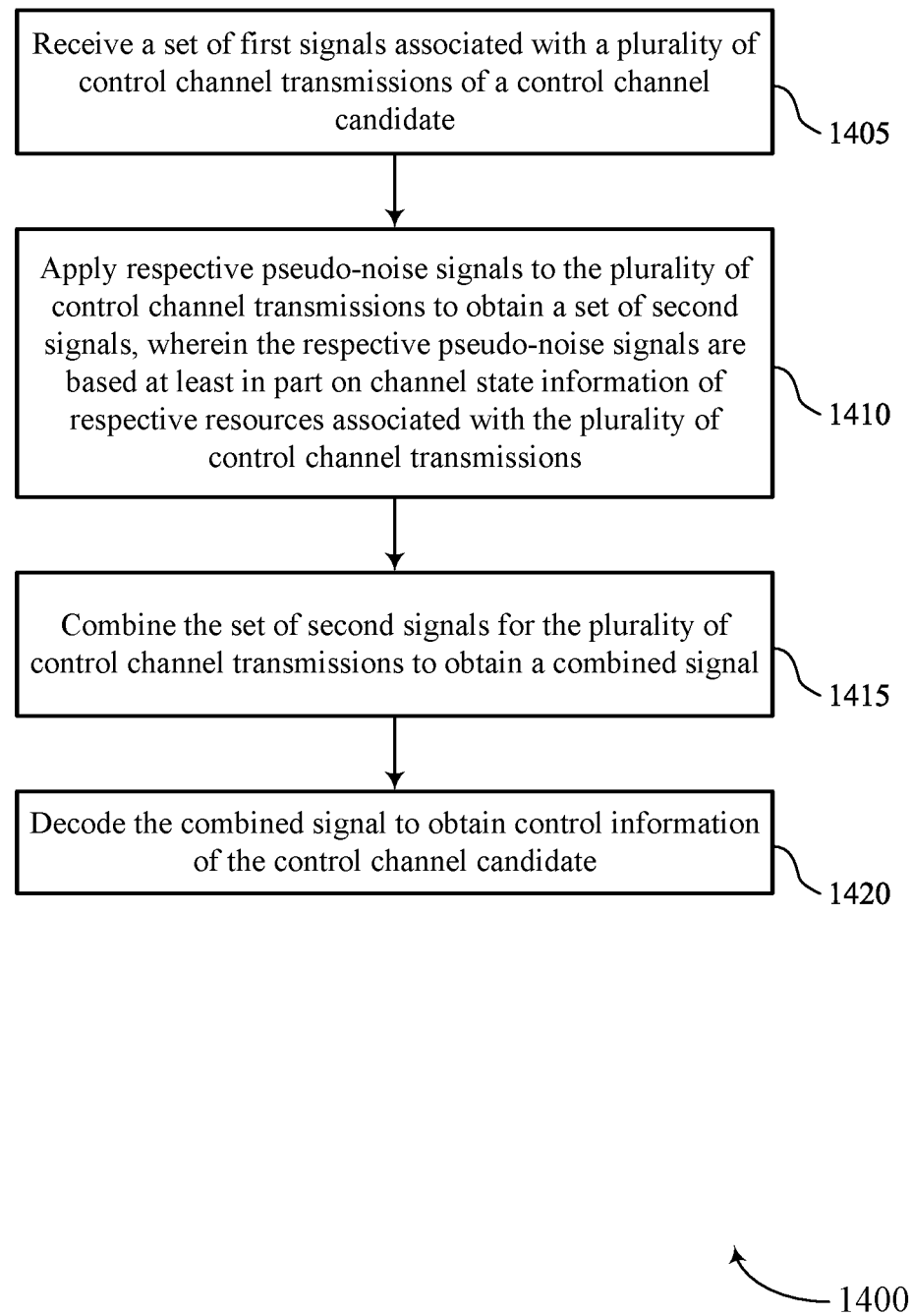
FIGS. 14 through 17 show flowcharts illustrating methods that support techniques for CSI based artificial noise injection in accordance with aspects of the present disclosure.

FIG. 14 shows a flowchart illustrating a method 1400 that supports techniques for channel state information based artificial noise injection in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a set of first signals associated with a set of multiple control channel transmissions of a control channel candidate. The operations of 1405 may be performed in accordance with examples as disclosed herein. In some examples, aspects of the operations of 1405 may be performed by a control channel component 825 as described with reference to FIG. 8.

At 1410, the method may include applying respective pseudo-noise signals to the set of multiple control channel transmissions to obtain a set of second signals, where the respective pseudo-noise signals are based on channel state information of respective resources associated with the set of multiple control channel transmissions. The operations of 1410 may be performed in accordance with examples as disclosed herein. In some examples, aspects of the operations of 1410 may be performed by a pseudo-noise component 830 as described with reference to FIG. 8.

At 1415, the method may include combining the set of second signals for the set of multiple control channel transmissions to obtain a combined signal. The operations of 1415 may be performed in accordance with examples as disclosed herein. In some examples, aspects of the operations of 1415 may be performed by a combining component 835 as described with reference to FIG. 8.

At 1420, the method may include decoding the combined signal to obtain control information of the control channel candidate. The operations of 1420 may be performed in accordance with examples as disclosed herein. In some examples, aspects of the operations of 1420 may be performed by a decoding component 840 as described with reference to FIG. 8.

Figure 15:
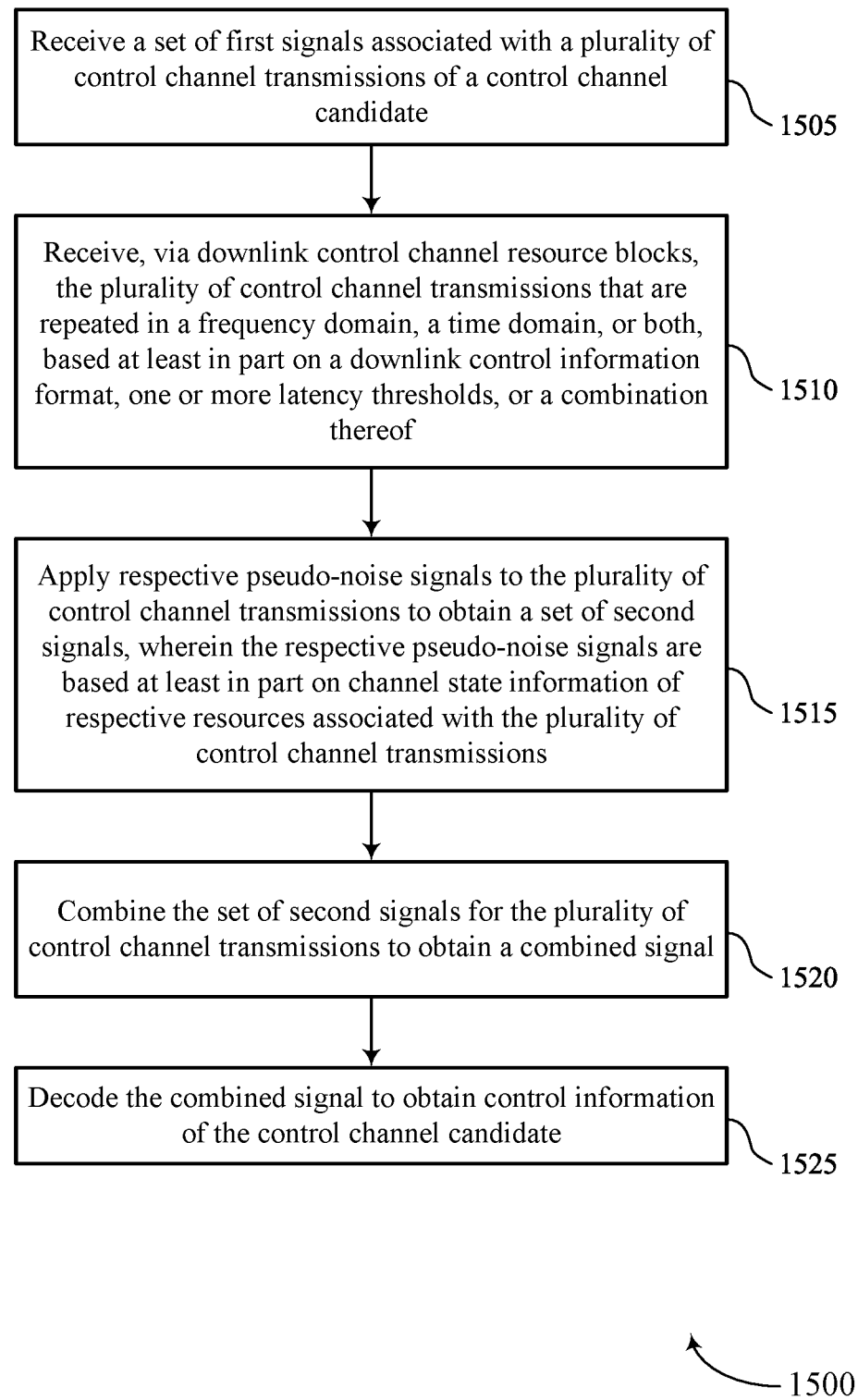

FIG. 15 shows a flowchart illustrating a method 1500 that supports techniques for channel state information based artificial noise injection in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a set of first signals associated with a set of multiple control channel transmissions of a control channel candidate. The operations of 1505 may be performed in accordance with examples as disclosed herein. In some examples, aspects of the operations of 1505 may be performed by a control channel component 825 as described with reference to FIG. 8.

At 1510, the method may include receiving the set of multiple control channel transmissions via downlink control channel resource blocks that are repeated in a frequency domain, a time domain, or both, based on a downlink control information format, one or more latency thresholds, or a combination thereof. The operations of 1510 may be performed in accordance with examples as disclosed herein. In some examples, aspects of the operations of 1510 may be performed by a control channel component 825 as described with reference to FIG. 8.

At 1515, the method may include applying respective pseudo-noise signals to the set of multiple control channel transmissions to obtain a set of second signals, where the respective pseudo-noise signals are based on channel state information of respective resources associated with the set of multiple control channel transmissions. The operations of 1515 may be performed in accordance with examples as disclosed herein. In some examples, aspects of the operations of 1515 may be performed by a pseudo-noise component 830 as described with reference to FIG. 8.

At 1520, the method may include combining the set of second signals for the set of multiple control channel transmissions to obtain a combined signal. The operations of 1520 may be performed in accordance with examples as disclosed herein. In some examples, aspects of the operations of 1520 may be performed by a combining component 835 as described with reference to FIG. 8.

At 1525, the method may include decoding the combined signal to obtain control information of the control channel candidate. The operations of 1525 may be performed in accordance with examples as disclosed herein. In some examples, aspects of the operations of 1525 may be performed by a decoding component 840 as described with reference to FIG. 8.

Figure 16:
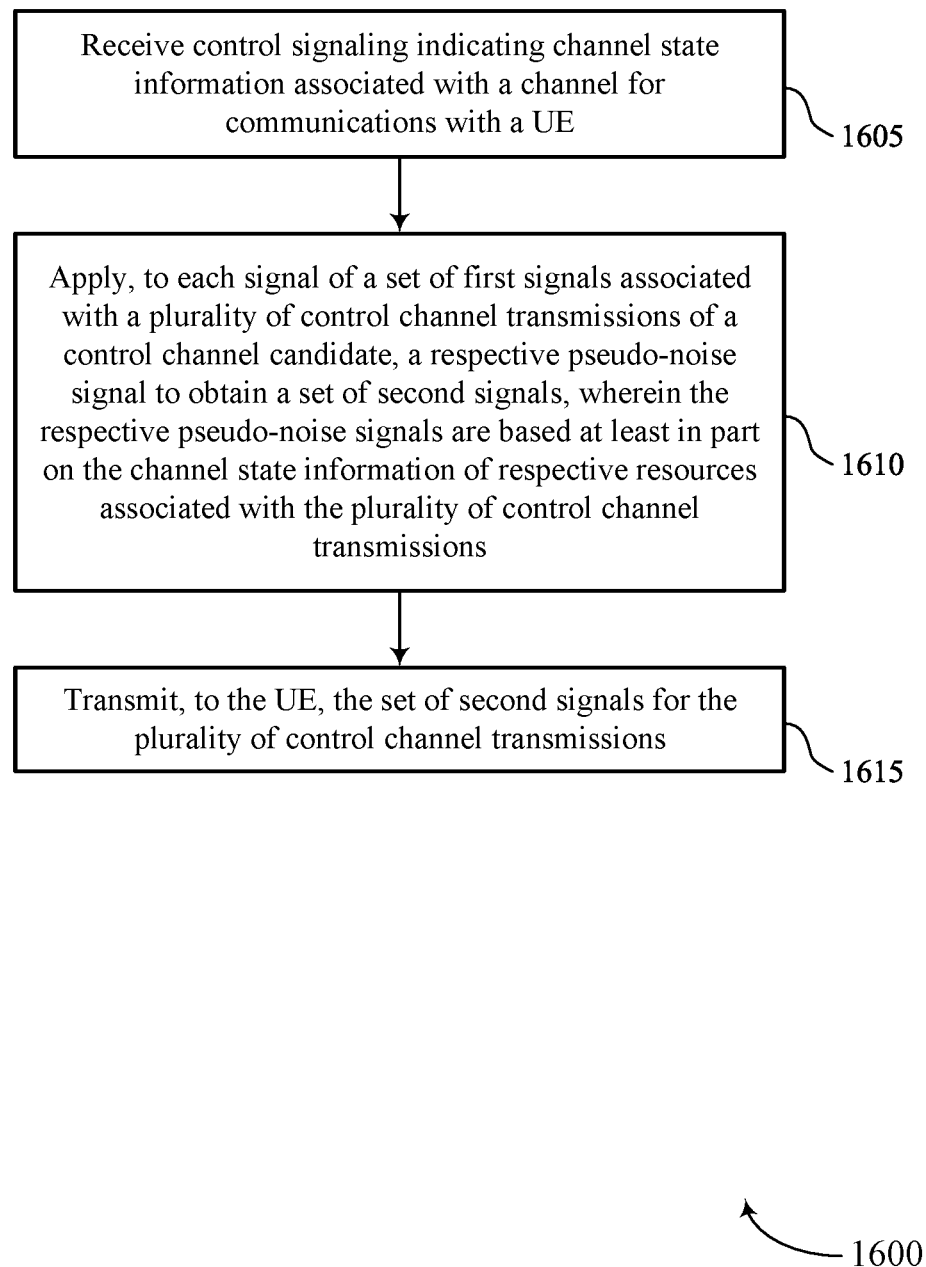

FIG. 16 shows a flowchart illustrating a method 1600 that supports techniques for channel state information based artificial noise injection in accordance with aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1605, the method may include receiving control signaling indicating channel state information associated with a channel for communications with a UE. The operations of 1605 may be performed in accordance with examples as disclosed herein. In some examples, aspects of the operations of 1605 may be performed by a CSI component 1225 as described with reference to FIG. 12.

At 1610, the method may include applying, to each signal of a set of first signals associated with a set of multiple control channel transmissions of a control channel candidate, a respective pseudo-noise signal to obtain a set of second signals, where the respective pseudo-noise signals are based on the channel state information of respective resources associated with the set of multiple control channel transmissions. The operations of 1610 may be performed in accordance with examples as disclosed herein. In some examples, aspects of the operations of 1610 may be performed by a pseudo-noise component 1230 as described with reference to FIG. 12.

At 1615, the method may include transmitting, to the UE, the set of second signals for the set of multiple control channel transmissions. The operations of 1615 may be performed in accordance with examples as disclosed herein. In some examples, aspects of the operations of 1615 may be performed by a control channel component 1235 as described with reference to FIG. 12.

Figure 17:
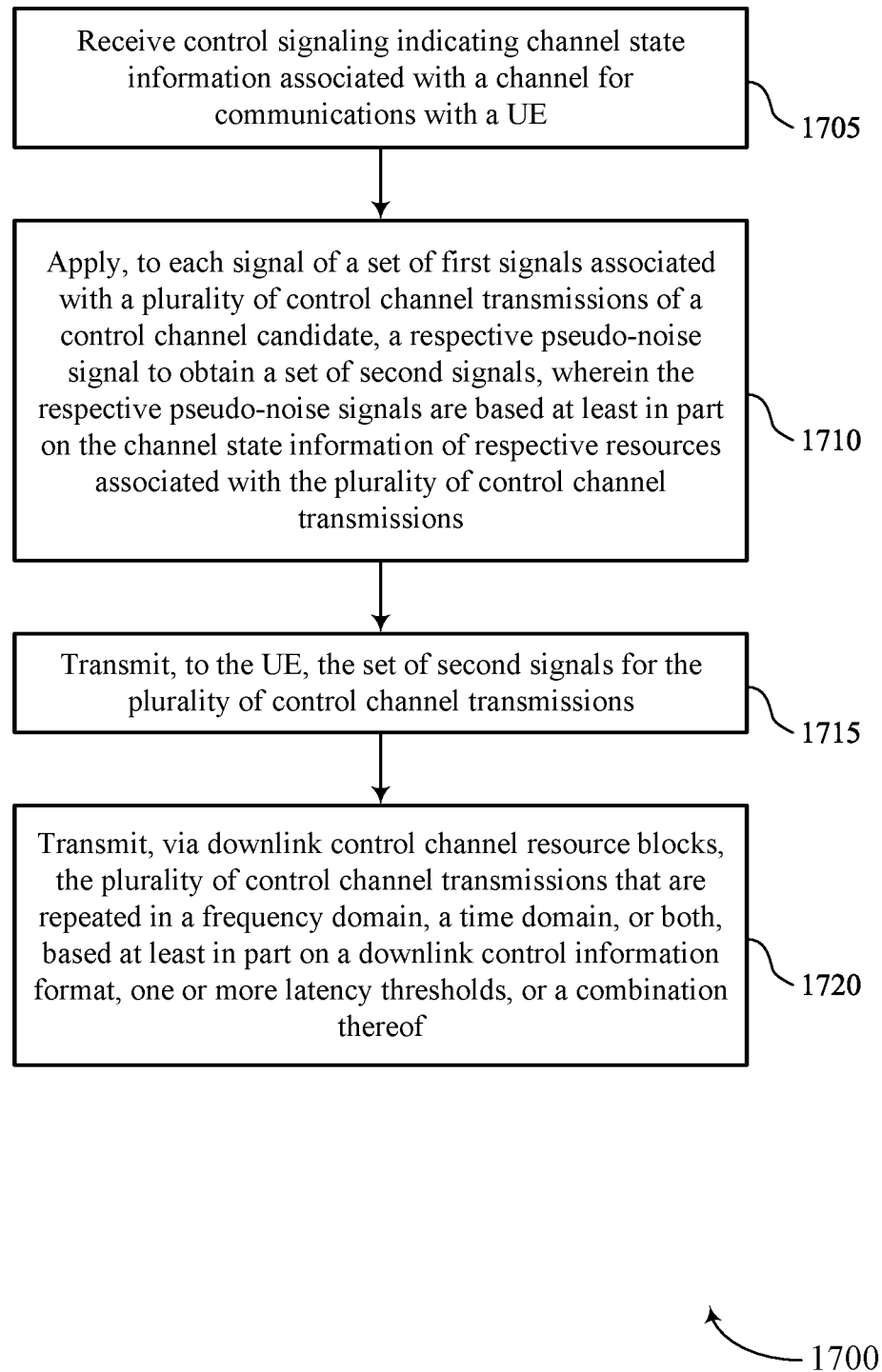

FIG. 17 shows a flowchart illustrating a method 1700 that supports techniques for channel state information based artificial noise injection in accordance with aspects of the present disclosure. The operations of the method 1700 may be implemented by a base station or its components as described herein. For example, the operations of the method 1700 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1705, the method may include receiving control signaling indicating channel state information associated with a channel for communications with a UE. The operations of 1705 may be performed in accordance with examples as disclosed herein. In some examples, aspects of the operations of 1705 may be performed by a CSI component 1225 as described with reference to FIG. 12.

At 1710, the method may include applying, to each signal of a set of first signals associated with a set of multiple control channel transmissions of a control channel candidate, a respective pseudo-noise signal to obtain a set of second signals, where the respective pseudo-noise signals are based on the channel state information of respective resources associated with the set of multiple control channel transmissions. The operations of 1710 may be performed in accordance with examples as disclosed herein. In some examples, aspects of the operations of 1710 may be performed by a pseudo-noise component 1230 as described with reference to FIG. 12.

At 1715, the method may include transmitting, to the UE, the set of second signals for the set of multiple control channel transmissions. The operations of 1715 may be performed in accordance with examples as disclosed herein. In some examples, aspects of the operations of 1715 may be performed by a control channel component 1235 as described with reference to FIG. 12.

At 1720, the method may include transmitting the set of multiple control channel transmissions via downlink control channel resource blocks that are repeated in a frequency domain, a time domain, or both, based on a downlink control information format, one or more latency thresholds, or a combination thereof. The operations of 1720 may be performed in accordance with examples as disclosed herein. In some examples, aspects of the operations of 1720 may be performed by a control channel component 1235 as described with reference to FIG. 12.

The following provides an overview of aspects of the present disclosure:

Aspect 1: A method for wireless communications at a UE, comprising: receiving a set of first signals associated with a plurality of control channel transmissions of a control channel candidate; applying respective pseudo-noise signals to the plurality of control channel transmissions to obtain a set of second signals, wherein the respective pseudo-noise signals are based at least in part on CSI of respective resources associated with the plurality of control channel transmissions; combining the set of second signals for the plurality of control channel transmissions to obtain a combined signal; and decoding the combined signal to obtain control information of the control channel candidate.

Aspect 2: The method of aspect 1, wherein combining the set of second signals comprises: summing the set of second signals for the plurality of control channel transmissions according to respective weight factors for the plurality of control channel transmissions.

Aspect 3: The method of any of aspects 1 through 2, further comprising: receiving the plurality of control channel transmissions via downlink control channel resource blocks that are repeated in a frequency domain, a time domain, or both, based at least in part on a downlink control information format, one or more latency thresholds, or a combination thereof.

Aspect 4: The method of aspect 3, wherein at least a first subset of the downlink control channel resource blocks are separated from at least a second subset of the downlink control channel resource blocks by a threshold value in the time domain, the frequency domain, or a combination thereof.

Aspect 5: The method of any of aspects 1 through 4, further comprising: receiving the plurality of control channel transmissions via downlink control channel resource blocks, wherein that are repeated in a single slot of a time domain, wherein each downlink control channel resource block is transmitted using a different beam.

Aspect 6: The method of any of aspects 1 through 5, further comprising: receiving the plurality of control channel transmissions via downlink control channel resource blocks that are repeated in a frequency domain, and wherein the plurality of control channel transmissions are associated with an aggregation level of a set of aggregation levels that is based at least in part on a quantity of repetitions of the plurality of control channel transmissions.

Aspect 7: The method of aspect 6, wherein the aggregation level comprises a first aggregation level for a first quantity of repetitions or a second aggregation level for a second quantity of repetitions.

Aspect 8: The method of any of aspects 1 through 7, wherein a power allocated to each control channel transmission is based at least in part on a channel quality indicator, a quality of service threshold, a security threshold, or any combination thereof.

Aspect 9: The method of any of aspects 1 through 8, further comprising: receiving control signaling indicating resources for the plurality of control channel transmissions in one or more search space sets.

Aspect 10: The method of aspect 9, wherein the control signaling comprises radio resource control signaling.

Aspect 11: The method of any of aspects 1 through 10, wherein each symbol of a respective noise signal included in a respective control channel transmission has a value associated with a constellation point from a finite constellation or a random constellation point.

Aspect 12: A method for wireless communications at a base station, comprising: receiving control signaling indicating CSI associated with a channel for communications with a UE; applying, to each signal of a set of first signals associated with a plurality of control channel transmissions of a control channel candidate, a respective pseudo-noise signal to obtain a set of second signals, wherein the respective pseudo-noise signals are based at least in part on the CSI of respective resources associated with the plurality of control channel transmissions; and transmitting, to the UE, the set of second signals for the plurality of control channel transmissions.

Aspect 13: The method of aspect 12, further comprising: transmitting the plurality of control channel transmissions via downlink control channel resource blocks that are repeated in a frequency domain, a time domain, or both, based at least in part on a downlink control information format, one or more latency thresholds, or a combination thereof.

Aspect 14: The method of aspect 13, wherein at least a first subset of the downlink control channel resource blocks are separated from at least a second subset of the downlink control channel resource blocks by a threshold value in the time domain, the frequency domain, or a combination thereof.

Aspect 15: The method of any of aspects 12 through 14, further comprising: transmitting the plurality of control channel transmissions via downlink control channel resource blocks that are repeated in a single slot of a time domain, wherein each downlink control channel resource block is transmitted using a different beam.

Aspect 16: The method of any of aspects 12 through 15, further comprising: transmitting the plurality of control channel transmissions via downlink control channel resource blocks that are repeated in a frequency domain, wherein the plurality of control channel transmissions are associated with an aggregation level of a set of aggregation levels that is based at least in part on a quantity of repetitions of the plurality of control channel transmissions.

Aspect 17: The method of aspect 16, wherein the aggregation level comprises a first aggregation level for a first quantity of repetitions or a second aggregation level for a second quantity of repetitions.

Aspect 18: The method of any of aspects 12 through 17, further comprising: allocating a power to each control channel transmission based at least in part on a CQI, a QoS threshold, a security threshold, or any combination thereof.

Aspect 19: The method of any of aspects 12 through 18, further comprising: transmitting control signaling indicating resources for the plurality of control channel transmissions in one or more search space sets.

Aspect 20: The method of aspect 19, wherein the control signaling comprises radio resource control signaling.

Aspect 21: The method of any of aspects 12 through 20, further comprising: selecting a value for each respective pseudo-noise signal, the value associated with a constellation point from a finite constellation or a random constellation point.

Aspect 22: An apparatus for wireless communications at a UE, comprising a processor; memory coupled with the processor; and instructions stored in the memory and executable by the processor to cause the apparatus to perform a method of any of aspects 1 through 11.

Aspect 23: An apparatus for wireless communications at a UE, comprising at least one means for performing a method of any of aspects 1 through 11.

Aspect 24: A non-transitory computer-readable medium storing code for wireless communications at a UE, the code comprising instructions executable by a processor to perform a method of any of aspects 1 through 11.

Aspect 25: An apparatus for wireless communications at a base station, comprising a processor; memory coupled with the processor; and instructions stored in the memory and executable by the processor to cause the apparatus to perform a method of any of aspects 12 through 21.

Aspect 26: An apparatus for wireless communications at a base station, comprising at least one means for performing a method of any of aspects 12 through 21.

Aspect 27: A non-transitory computer-readable medium storing code for wireless communications at a base station, the code comprising instructions executable by a processor to perform a method of any of aspects 12 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a set of first signals associated with a plurality of control channel transmissions of a control channel candidate;
   applying respective pseudo-noise signals to the plurality of control channel transmissions to obtain a set of second signals, wherein the respective pseudo-noise signals are based at least in part on channel state information of respective resources associated with the plurality of control channel transmissions;
   combining the set of second signals for the plurality of control channel transmissions to obtain a combined signal; and
   decoding the combined signal to obtain control information of the control channel candidate.

2. The method of claim 1, wherein combining the set of second signals comprises:
   summing the set of second signals for the plurality of control channel transmissions according to respective weight factors for the plurality of control channel transmissions.

3. The method of claim 1, further comprising:
   receiving the plurality of control channel transmissions via downlink control channel resource blocks that are repeated in a frequency domain, a time domain, or both, based at least in part on a downlink control information format, one or more latency thresholds, or a combination thereof.

4. The method of claim 3, wherein at least a first subset of the downlink control channel resource blocks are separated from at least a second subset of the downlink control channel resource blocks by a threshold value in the time domain, the frequency domain, or a combination thereof.

5. The method of claim 1, further comprising:
   receiving the plurality of control channel transmissions via downlink control channel resource blocks, wherein that are repeated in a single slot of a time domain, wherein each downlink control channel resource block is transmitted using a different beam.

6. The method of claim 1, further comprising:
receiving the plurality of control channel transmissions via downlink control channel resource blocks that are repeated in a frequency domain, and wherein the plurality of control channel transmissions are associated with an aggregation level of a set of aggregation levels that is based at least in part on a quantity of repetitions of the plurality of control channel transmissions.

7. The method of claim 6, wherein the aggregation level comprises a first aggregation level for a first quantity of repetitions or a second aggregation level for a second quantity of repetitions.

8. The method of claim 1, wherein a power allocated to each control channel transmission is based at least in part on a channel quality indicator, a quality of service threshold, a security threshold, or any combination thereof.

9. The method of claim 1, further comprising:
receiving control signaling indicating resources for the plurality of control channel transmissions in one or more search space sets.

10. The method of claim 9, wherein the control signaling comprises radio resource control signaling.

11. The method of claim 1, wherein each symbol of a respective noise signal included in a respective control channel transmission has a value associated with a constellation point from a finite constellation or a random constellation point.

12. A method for wireless communications at a base station, comprising:
receiving control signaling indicating channel state information associated with a channel for communications with a user equipment (UE);
applying, to each signal of a set of first signals associated with a plurality of control channel transmissions of a control channel candidate, a respective pseudo-noise signal to obtain a set of second signals, wherein the respective pseudo-noise signals are based at least in part on the channel state information of respective resources associated with the plurality of control channel transmissions; and
transmitting, to the UE, the set of second signals for the plurality of control channel transmissions.

13. The method of claim 12, further comprising:
transmitting the plurality of control channel transmissions via downlink control channel resource blocks that are repeated in a frequency domain, a time domain, or both, based at least in part on a downlink control information format, one or more latency thresholds, or a combination thereof.

14. The method of claim 13, wherein at least a first subset of the downlink control channel resource blocks are separated from at least a second subset of the downlink control channel resource blocks by a threshold value in the time domain, the frequency domain, or a combination thereof.

15. The method of claim 12, further comprising:
transmitting the plurality of control channel transmissions via downlink control channel resource blocks that are repeated in a single slot of a time domain, wherein each downlink control channel resource block is transmitted using a different beam.

16. The method of claim 12, further comprising:
transmitting the plurality of control channel transmissions via downlink control channel resource blocks that are repeated in a frequency domain, wherein the plurality of control channel transmissions are associated with an aggregation level of a set of aggregation levels that is based at least in part on a quantity of repetitions of the plurality of control channel transmissions.

17. The method of claim 16, wherein the aggregation level comprises a first aggregation level for a first quantity of repetitions or a second aggregation level for a second quantity of repetitions.

18. The method of claim 12, further comprising:
allocating a power to each control channel transmission based at least in part on a channel quality indicator, a quality of service threshold, a security threshold, or any combination thereof.

19. The method of claim 12, further comprising:
transmitting control signaling indicating resources for the plurality of control channel transmissions in one or more search space sets.

20. The method of claim 19, wherein the control signaling comprises radio resource control signaling.

21. The method of claim 12, further comprising:
selecting a value for each respective pseudo-noise signal, the value associated with a constellation point from a finite constellation or a random constellation point.

22. An apparatus for wireless communications at a user equipment (UE), comprising:
a processor;
memory coupled with the processor; and
instructions stored in the memory and executable by the processor to cause the apparatus to:
receive a set of first signals associated with a plurality of control channel transmissions of a control channel candidate;
apply respective pseudo-noise signals to the plurality of control channel transmissions to obtain a set of second signals, wherein the respective pseudo-noise signals are based at least in part on channel state information of respective resources associated with the plurality of control channel transmissions;
combine the set of second signals for the plurality of control channel transmissions to obtain a combined signal; and
decode the combined signal to obtain control information of the control channel candidate.

23. The apparatus of claim 22, wherein the instructions to combine the set of second signals are executable by the processor to cause the apparatus to:
sum the set of second signals for the plurality of control channel transmissions according to respective weight factors for the plurality of control channel transmissions.

24. The apparatus of claim 22, wherein the instructions are further executable by the processor to cause the apparatus to:
receive the plurality of control channel transmissions via downlink control channel resource blocks that are repeated in a frequency domain, a time domain, or both, based at least in part on a downlink control information format, one or more latency thresholds, or a combination thereof.

25. The apparatus of claim 24, wherein at least a first subset of the downlink control channel resource blocks are separated from at least a second subset of the downlink control channel resource blocks by a threshold value in the time domain, the frequency domain, or a combination thereof.

26. The apparatus of claim 22, wherein the instructions are further executable by the processor to cause the apparatus to:

receive the plurality of control channel transmissions via downlink control channel resource blocks that are repeated in a single slot of a time domain, wherein each downlink control channel resource block is transmitted using a different beam.

27. The apparatus of claim 22, wherein the instructions are further executable by the processor to cause the apparatus to:

receive the plurality of control channel transmissions via downlink control channel resource blocks that are repeated in a frequency domain, wherein the plurality of control channel transmissions are associated with an aggregation level of a set of aggregation levels that is based at least in part on a quantity of repetitions of the plurality of control channel transmissions.

28. The apparatus of claim 27, wherein the aggregation level comprises a first aggregation level for a first quantity of repetitions or a second aggregation level for a second quantity of repetitions.

29. The apparatus of claim 22, wherein a power allocated to each control channel transmission is based at least in part on a channel quality indicator, a quality of service threshold, a security threshold, or any combination thereof.

30. An apparatus for wireless communications at a base station, comprising:

a processor;

memory coupled with the processor; and instructions stored in the memory and executable by the processor to cause the apparatus to:

receive control signaling indicating channel state information associated with a channel for communications with a user equipment (UE);

apply, to each signal of a set of first signals associated with a plurality of control channel transmissions of a control channel candidate, a respective pseudo-noise signal to obtain a set of second signals, wherein the respective pseudo-noise signals are based at least in part on the channel state information of respective resources associated with the plurality of control channel transmissions; and transmit, to the UE, the set of second signals for the plurality of control channel transmissions.

* * * * *